US012638306B2

(12) United States Patent
Karmakar et al.

(10) Patent No.: US 12,638,306 B2
(45) Date of Patent: May 26, 2026

(54) AUTOMATED TOOL FOR DETERMINING AND PROVIDING BUILDING INFORMATION FOR MULTIPLE PARTIALLY DESCRIBED PROXIMATE GEOGRAPHICAL REGIONS

(71) Applicant: MFTB Holdco, Inc., Seattle, WA (US)

(72) Inventors: Aveek Karmakar, Issaquah, WA (US); Gowri Kumaraguruapran, Mountain House, CA (US); Pavan Sudhir Nallam, Lathrop, CA (US)

(73) Assignee: MFTB Holdco, Inc., Seattle, WA (US)

( * ) Notice: Subject to any disclaimer, the term of this patent is extended or adjusted under 35 U.S.C. 154(b) by 135 days.

(21) Appl. No.: 18/583,602

(22) Filed: Feb. 21, 2024

(65) Prior Publication Data

US 2025/0244146 A1      Jul. 31, 2025

Related U.S. Application Data

(60) Provisional application No. 63/625,139, filed on Jan. 25, 2024.

(51) Int. Cl.
*G06F 16/29* (2019.01)
*G01C 21/00* (2006.01)
(Continued)

(52) U.S. Cl.
CPC ...... *G01C 21/3874* (2020.08); *G01C 21/3811* (2020.08); *G06F 16/243* (2019.01); *G06F 16/29* (2019.01); *G06F 16/953* (2019.01)

(58) Field of Classification Search
None
See application file for complete search history.

(56) References Cited

U.S. PATENT DOCUMENTS

| | | | | |
|---|---|---|---|---|
| 8,347,202 B1 * | 1/2013 | Vespe | ................... | G06F 40/279 |
| | | | | 715/208 |
| 9,396,276 B2 * | 7/2016 | Hendrey | ............. | G06F 16/3322 |
| 2016/0258767 A1 * | 9/2016 | Nevrekar | ........... | G01C 21/3682 |

FOREIGN PATENT DOCUMENTS

| | | |
|---|---|---|
| EP | 2241983 B1 | 12/2012 |

OTHER PUBLICATIONS

"Zillow's new AI-powered natural-language search is a first in real estate", Jan. 26, 2023, retrieved on Nov. 22, 2023 from https://investors.zillowgroup.com/investors/news-and-events/news/news-details/2023/Zillows-new-AI-powered-natural-language-search-is-a-first-in-real-estate/default.aspx, 2 pages.

(Continued)

*Primary Examiner* — Amresh Singh
(74) *Attorney, Agent, or Firm* — VLP Law Group LLP; James A.D. White

(57) ABSTRACT

Techniques are described for performing automated operations related to determining and providing information about buildings in multiple geographical regions in response to a query with partial descriptions of the regions and optionally partial descriptions of one or more additional locations in the regions, such as to automatically respond to a free-form natural language request having partial descriptions of names of multiple proximate geographical regions and of one or more point-of-interest (POI) locations by determining the intended geographical regions and POI locations and using them in generating corresponding response information. The described techniques may do inter-position distance filtering for at least some combinations of geographical region candidates and POI location candidates, and using a top-ranked combination that has a candidate for each geographical region and POI location designation in the (Continued)

query to determine responsive information for the received query.

23 Claims, 11 Drawing Sheets

(51) Int. Cl.
    *G06F 16/242*     (2019.01)
    *G06F 16/953*     (2019.01)

(56)            References Cited

OTHER PUBLICATIONS

"Zillow builds ChatGPT plugin for real estate searches", May 2, 2023, retrieved on Dec. 18, 2023 from https://investors.zillowgroup.com/investors/news-and-events/news/news-details/2023/Zillow-builds-ChatGPT-plugin-for-real-estate-searches/default.aspx, 2 pages.
Homesnapblog, "New: Draw Your Own Search Area To Look For Homes", May 24, 2018, retrieved on Nov. 22, 2023 from https://blog.homesnap.com/homesnap-draw-your-own-search-area-homes/, 8 pages.
"Zillow home-search tools that can help you search multiple locations—or draw your own search map", Feb. 26, 2013, retrieved on Nov. 22, 2023 from https://www.zillowgroup.com/news/new-draw-your-own-search-on-zillow-com/, 4 pages.

\* cited by examiner

*Fig. 1B*

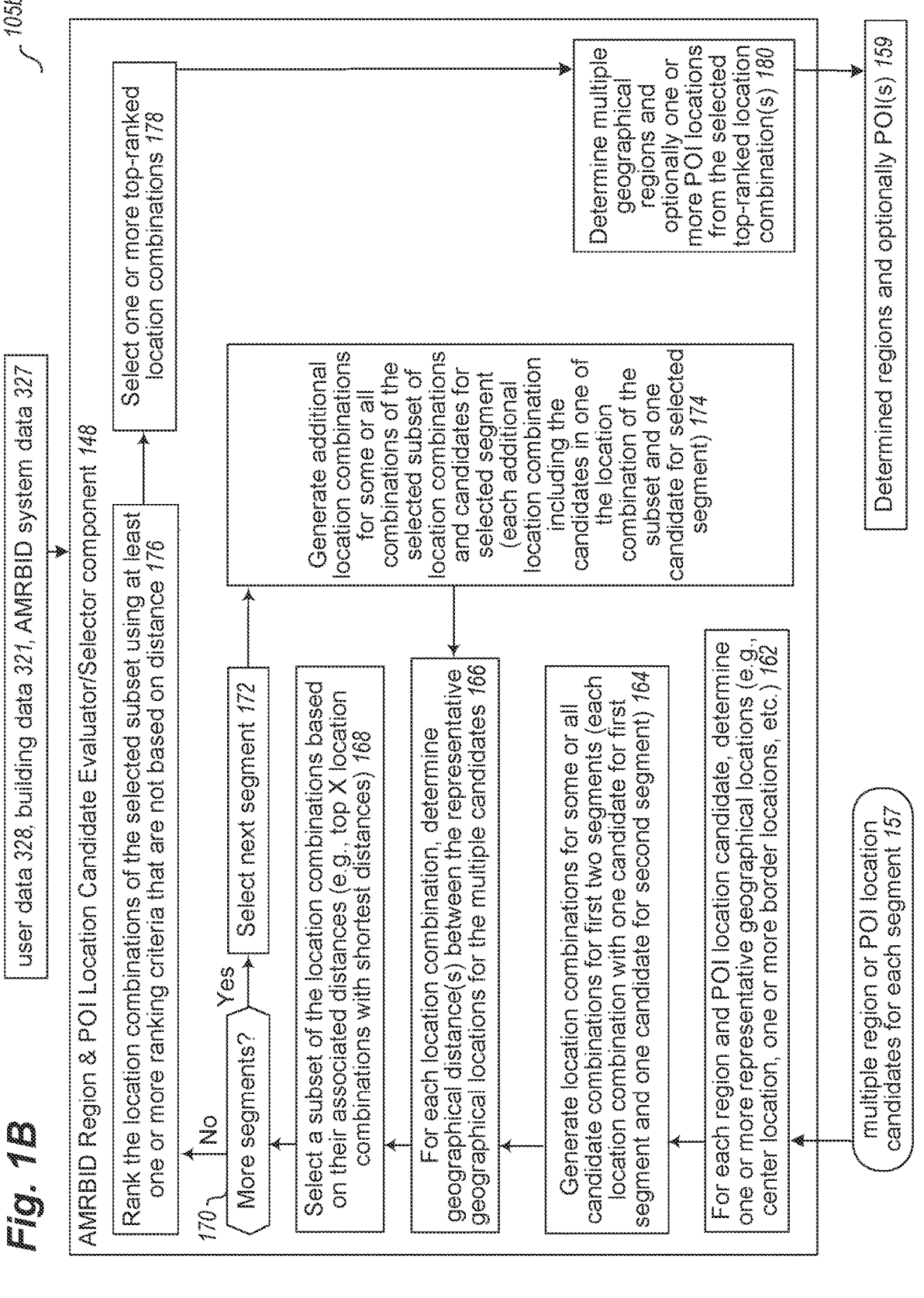

105b user data *328*, building data *321*, AMRBID system data *327*

AMRBID Region & POI Location Candidate Evaluator/Selector component *148*

Select one or more top-ranked location combinations *178*

Rank the location combinations of the selected subset using at least one or more ranking criteria that are not based on distance *176*

Determine multiple geographical regions and optionally one or more POI locations from the selected top-ranked location combination(s) *180*

No

More segments? *170*

Yes

Select next segment *172*

Select a subset of the location combinations based on their associated distances (e.g., top X location combinations with shortest distances) *168*

Generate additional location combinations for some or all combinations of the selected subset of location combinations and candidates for selected segment (each additional location combination including the candidates in one of the location combination of the subset and one candidate for selected segment) *174*

For each location combination, determine geographical distance(s) between the representative geographical locations for the multiple candidates *166*

Generate location combinations for first two segments (each location combination with one candidate for first segment and one candidate for second segment) *164*

For each region and POI location candidate, determine one or more representative geographical locations (e.g., center location, one or more border locations, etc.) *162* multiple region or POI location candidates for each segment *157*

Determined regions and optionally POI(s) *159*

Figure 2A:
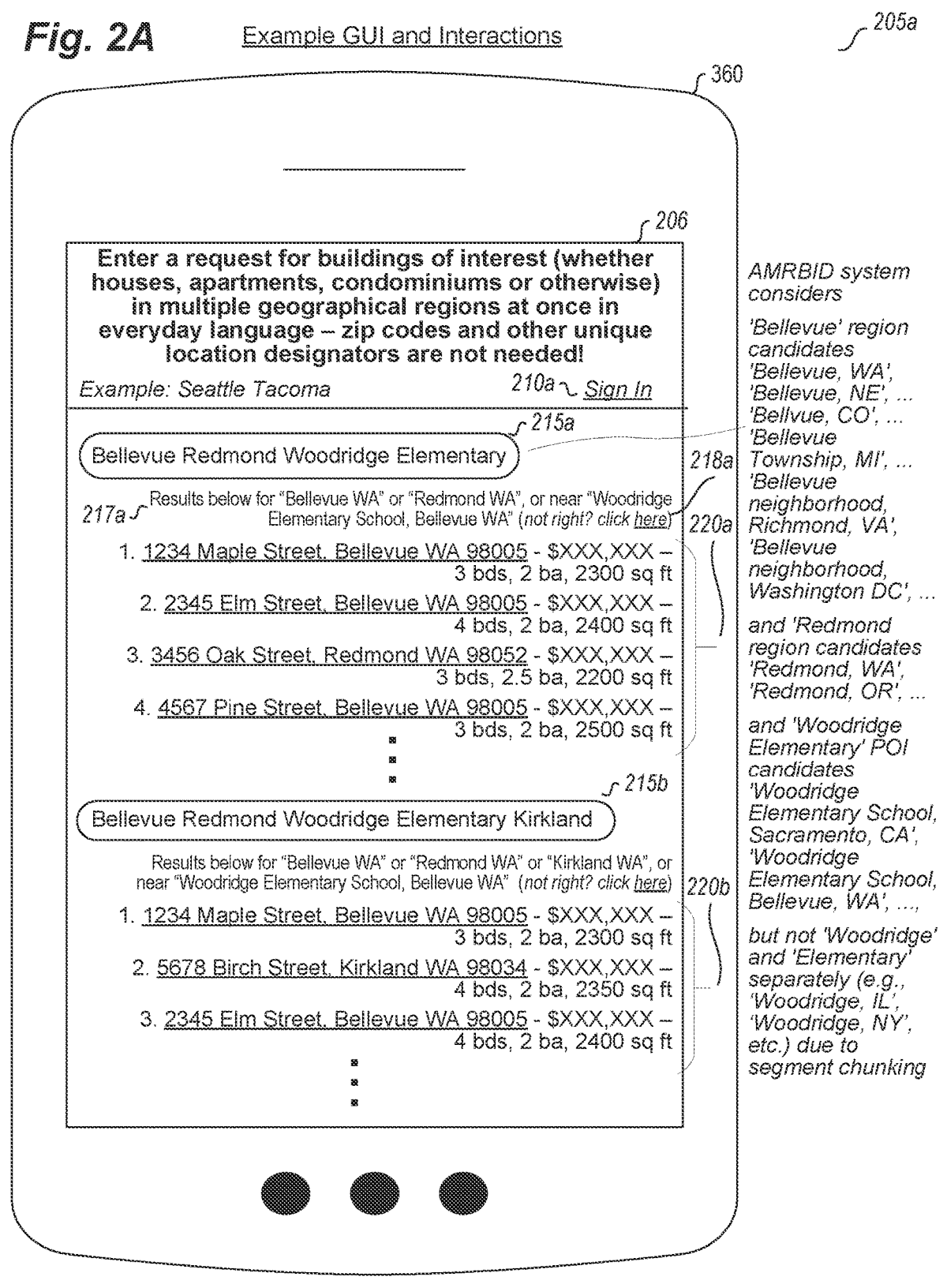

*Fig. 2A*     Example GUI and Interactions     205a

360

206

Enter a request for buildings of interest (whether houses, apartments, condominiums or otherwise) in multiple geographical regions at once in everyday language – zip codes and other unique location designators are not needed!

*Example: Seattle Tacoma*     210a ↘ Sign In

215a ( Bellevue Redmond Woodridge Elementary )

218a

217a ↙ Results below for "Bellevue WA" or "Redmond WA", or near "Woodridge Elementary School, Bellevue WA" (*not right? click here*)

220a 1. 1234 Maple Street, Bellevue WA 98005 - $XXX,XXX – 3 bds, 2 ba, 2300 sq ft 2. 2345 Elm Street, Bellevue WA 98005 - $XXX,XXX – 4 bds, 2 ba, 2400 sq ft 3. 3456 Oak Street, Redmond WA 98052 - $XXX,XXX – 3 bds, 2.5 ba, 2200 sq ft 4. 4567 Pine Street, Bellevue WA 98005 - $XXX,XXX – 3 bds, 2 ba, 2500 sq ft

⋮

215b ( Bellevue Redmond Woodridge Elementary Kirkland )

Results below for "Bellevue WA" or "Redmond WA" or "Kirkland WA", or near "Woodridge Elementary School, Bellevue WA" (*not right? click here*)

220b 1. 1234 Maple Street, Bellevue WA 98005 - $XXX,XXX – 3 bds, 2 ba, 2300 sq ft 2. 5678 Birch Street, Kirkland WA 98034 - $XXX,XXX – 4 bds, 2 ba, 2350 sq ft 3. 2345 Elm Street, Bellevue WA 98005 - $XXX,XXX – 4 bds, 2 ba, 2400 sq ft

⋮

*AMRBID system considers*

*'Bellevue' region candidates 'Bellevue, WA', 'Bellevue, NE', ... 'Bellvue, CO', ... 'Bellevue Township, MI', ... 'Bellevue neighborhood, Richmond, VA', 'Bellevue neighborhood, Washington DC', ...*

*and 'Redmond region candidates 'Redmond, WA', 'Redmond, OR', ...*

*and 'Woodridge Elementary' POI candidates 'Woodridge Elementary School, Sacramento, CA', 'Woodridge Elementary School, Bellevue, WA', ...,*

*but not 'Woodridge' and 'Elementary' separately (e.g., 'Woodridge, IL', 'Woodridge, NY', etc.) due to segment chunking*

*Fig. 2B*     <u>Example GUI and Interactions</u>     ⌐ 205b
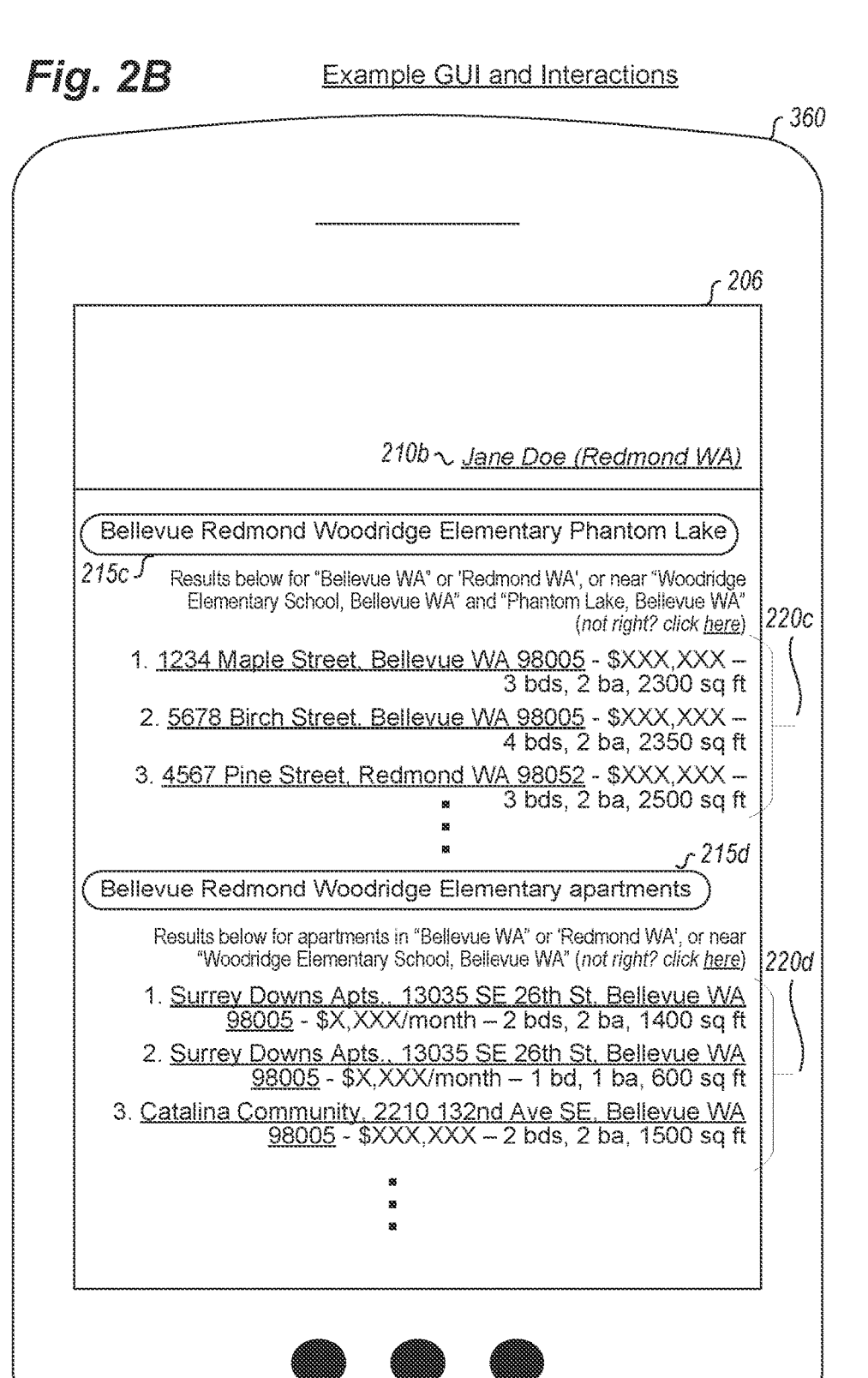

*Fig. 2C*

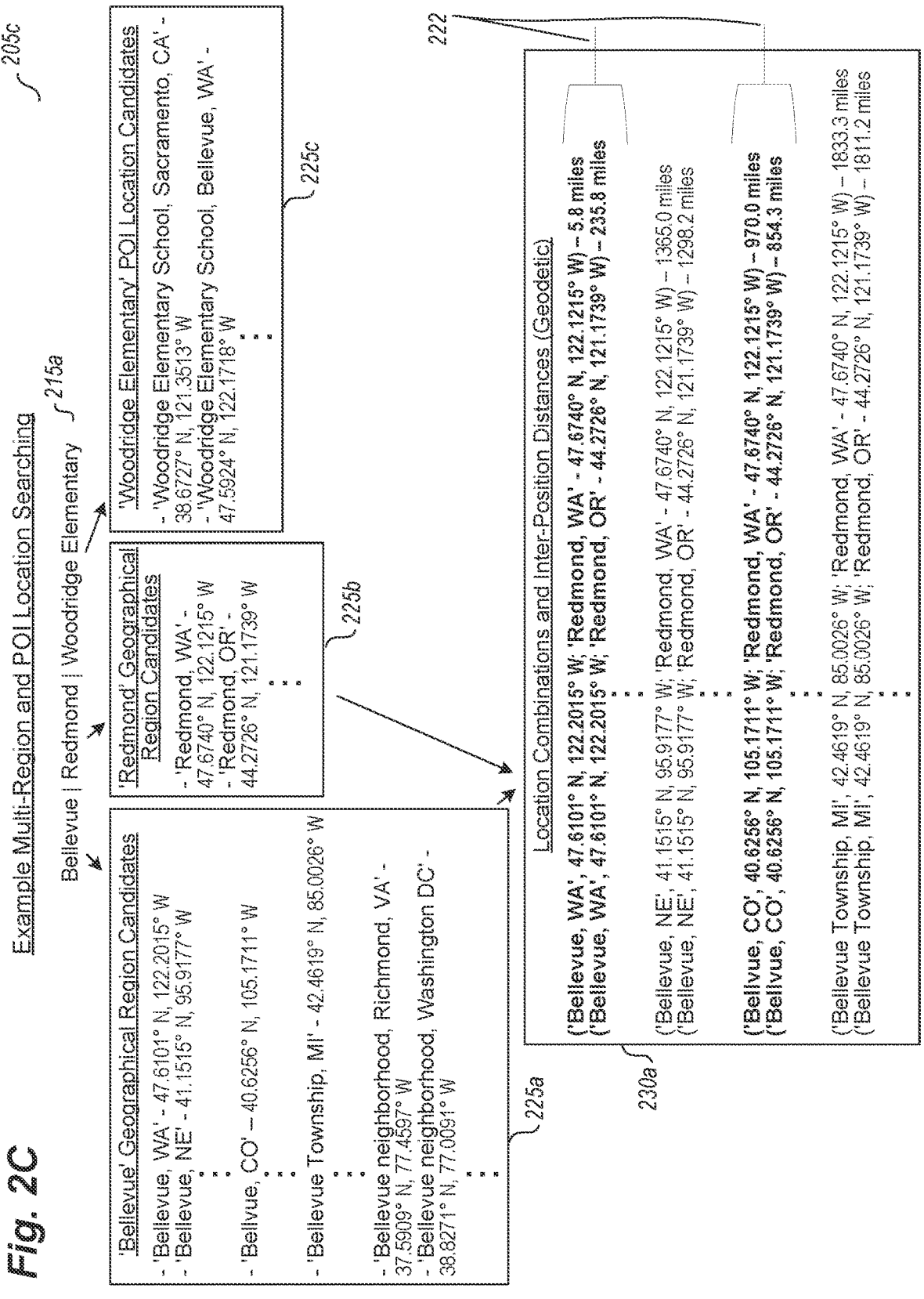

205c

Example Multi-Region and POI Location Searching          215a

Bellevue | Redmond | Woodridge Elementary

'Bellevue' Geographical Region Candidates

- 'Bellevue, WA' - 47.6101° N, 122.2015° W
- 'Bellevue, NE' - 41.1515° N, 95.9177° W
     . . . . .
- 'Bellvue, CO' – 40.6256° N, 105.1711° W
     . . . . .
- 'Bellevue Township, MI' - 42.4619° N, 85.0026° W
     . . . .
- 'Bellevue neighborhood, Richmond, VA' - 37.5909° N, 77.4597° W
- 'Bellevue neighborhood, Washington DC' - 38.8271° N, 77.0091° W
     . . . .

225a

'Redmond' Geographical Region Candidates

- 'Redmond, WA' - 47.6740° N, 122.1215° W
- 'Redmond, OR' - 44.2726° N, 121.1739° W
     . . . .

225b

'Woodridge Elementary' POI Location Candidates

- 'Woodridge Elementary School, Sacramento, CA' - 38.6727° N, 121.3513° W
- 'Woodridge Elementary School, Bellevue, WA' - 47.5924° N, 122.1718° W
     . . .

225c

222

Location Combinations and Inter-Position Distances (Geodetic)

('Bellevue, WA', 47.6101° N, 122.2015° W; 'Redmond, WA' - 47.6740° N, 122.1215° W) – 5.8 miles
('Bellevue, WA', 47.6101° N, 122.2015° W; 'Redmond, OR' - 44.2726° N, 121.1739° W) – 235.8 miles
          . . . . .
('Bellevue, NE', 41.1515° N, 95.9177° W; 'Redmond, WA' - 47.6740° N, 122.1215° W) – 1365.0 miles
('Bellevue, NE', 41.1515° N, 95.9177° W; 'Redmond, OR' - 44.2726° N, 121.1739° W) – 1298.2 miles
          . . . . .
('Bellvue, CO', 40.6256° N, 105.1711° W; 'Redmond, WA' - 47.6740° N, 122.1215° W) – 970.0 miles
('Bellvue, CO', 40.6256° N, 105.1711° W; 'Redmond, OR' - 44.2726° N, 121.1739° W) – 854.3 miles
          . . . . .
('Bellevue Township, MI', 42.4619° N, 85.0026° W; 'Redmond, WA' - 47.6740° N, 122.1215° W) – 1833.3 miles
('Bellevue Township, MI', 42.4619° N, 85.0026° W; 'Redmond, OR' - 44.2726° N, 121.1739° W) – 1811.2 miles 230a

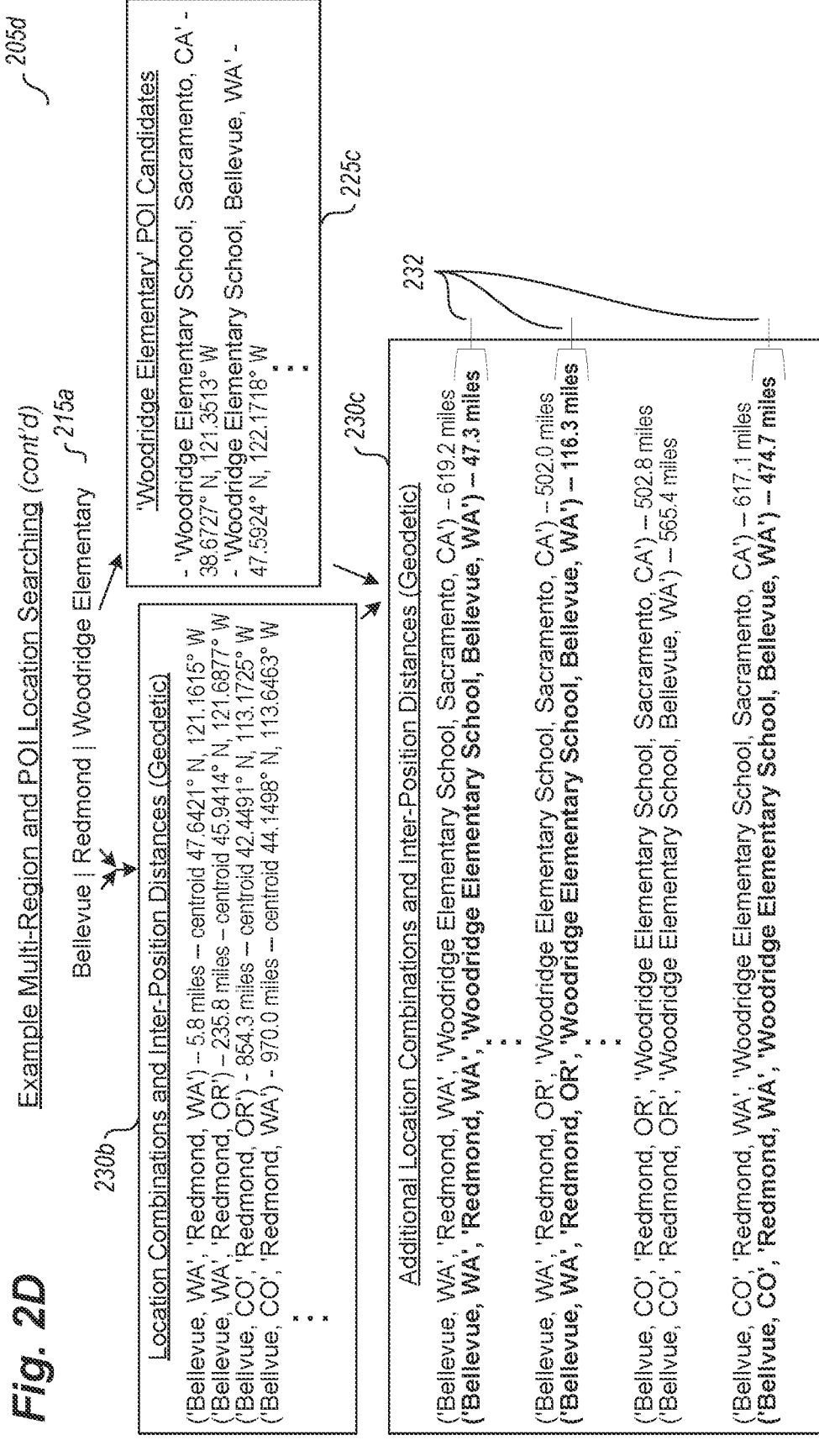

*Fig. 2D*

Example Multi-Region and POI Location Searching *(cont'd)*

Bellevue | Redmond | Woodridge Elementary ∫ 215a

‾205d

'Woodridge Elementary' POI Candidates

- 'Woodridge Elementary School, Sacramento, CA' – 38.6727° N, 121.3513° W
- 'Woodridge Elementary School, Bellevue, WA' – 47.5924° N, 122.1718° W
- ...

∫ 225c

Location Combinations and Inter-Position Distances (Geodetic)

('Bellevue, WA', 'Redmond, WA', 'Woodridge Elementary School, Sacramento, CA') – 5.8 miles – centroid 47.6421° N, 121.1615° W
('Bellevue, WA', 'Redmond, OR', 'Woodridge Elementary School, Sacramento, CA') – 235.8 miles – centroid 45.9414° N, 121.6877° W
('Bellevue, CO', 'Redmond, OR', 'Woodridge Elementary School, Sacramento, CA') - 854.3 miles – centroid 42.4491° N, 113.1725° W
('Bellevue, CO', 'Redmond, WA', 'Woodridge Elementary School, Sacramento, CA') - 970.0 miles – centroid 44.1498° N, 113.6463° W
...

230b

Additional Location Combinations and Inter-Position Distances (Geodetic)

('Bellevue, WA', 'Redmond, WA', 'Woodridge Elementary School, Sacramento, CA') – 619.2 miles
('Bellevue, WA', 'Redmond, WA', 'Woodridge Elementary School, Bellevue, WA') — 47.3 miles
...

('Bellevue, WA', 'Redmond, OR', 'Woodridge Elementary School, Sacramento, CA') – 502.0 miles
('Bellevue, WA', 'Redmond, OR', 'Woodridge Elementary School, Bellevue, WA') — 116.3 miles
...

('Bellevue, CO', 'Redmond, OR', 'Woodridge Elementary School, Sacramento, CA') — 502.8 miles
('Bellevue, CO', 'Redmond, OR', 'Woodridge Elementary School, Bellevue, WA') — 565.4 miles ('Bellvue, CO', 'Redmond, WA', 'Woodridge Elementary School, Sacramento, CA') — 617.1 miles
('Bellvue, CO', 'Redmond, WA', 'Woodridge Elementary School, Bellevue, WA') — 474.7 miles 230c

232

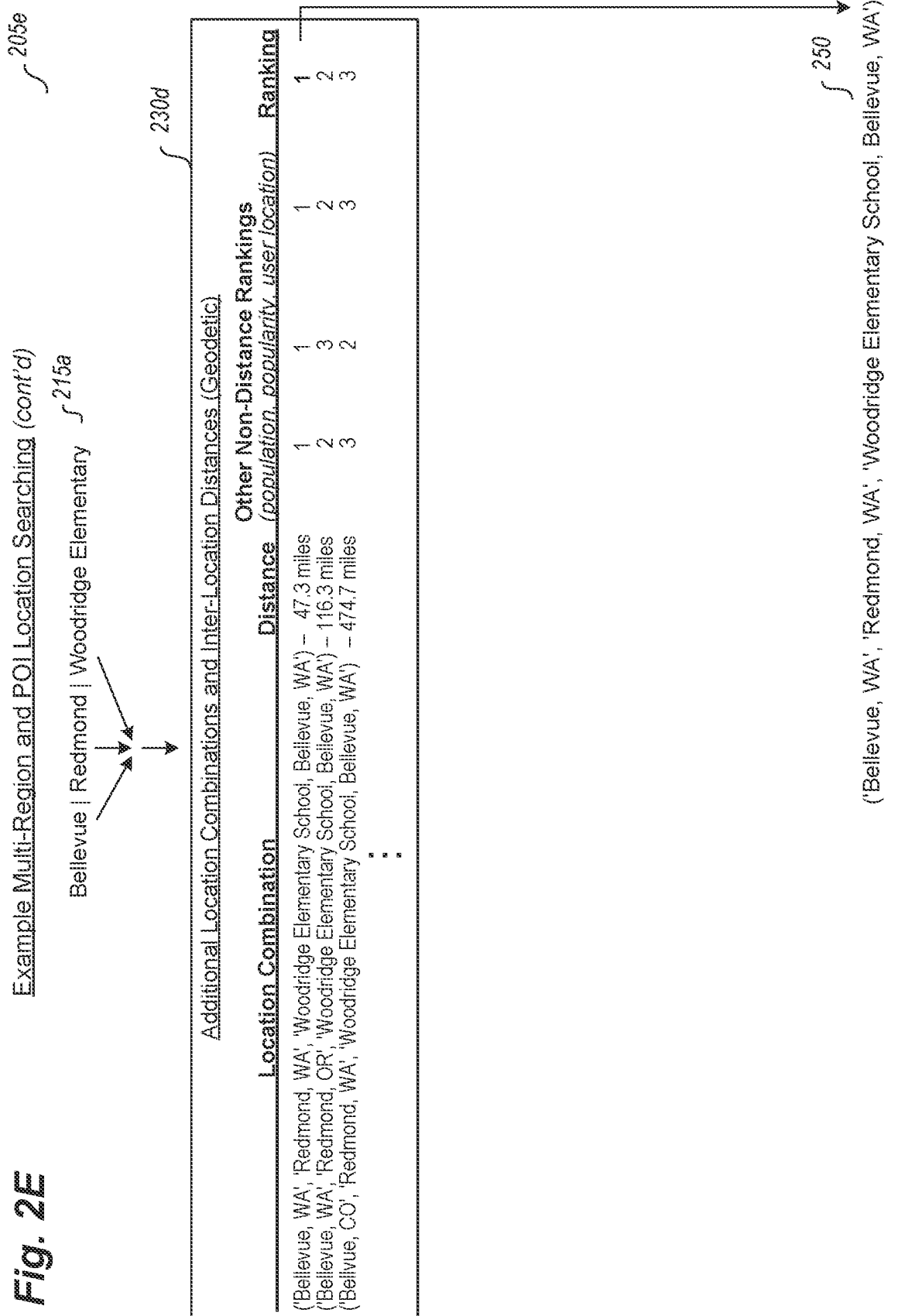

*Fig. 2E*

Example Multi-Region and POI Location Searching *(cont'd)*    ⟋ 205e

Bellevue | Redmond | Woodridge Elementary    ⟋ 215a

230d

Additional Location Combinations and Inter-Location Distances (Geodetic)

| Location Combination | Distance | Other Non-Distance Rankings *(population, popularity, user location)* | | | Ranking |
|---|---|---|---|---|---|
| ('Bellevue, WA', 'Redmond, WA', 'Woodridge Elementary School, Bellevue, WA') – 47.3 miles | | 1 | 1 | 1 | 1 |
| ('Bellevue, WA', 'Redmond, OR', 'Woodridge Elementary School, Bellevue, WA') – 116.3 miles | | 2 | 3 | 2 | 2 |
| ('Bellevue, CO', 'Redmond, WA', 'Woodridge Elementary School, Bellevue, WA') – 474.7 miles | | 3 | 2 | 3 | 3 |
| . . . | | | | | |

('Bellevue, WA', 'Redmond, WA', 'Woodridge Elementary School, Bellevue, WA')    ⟋ 250

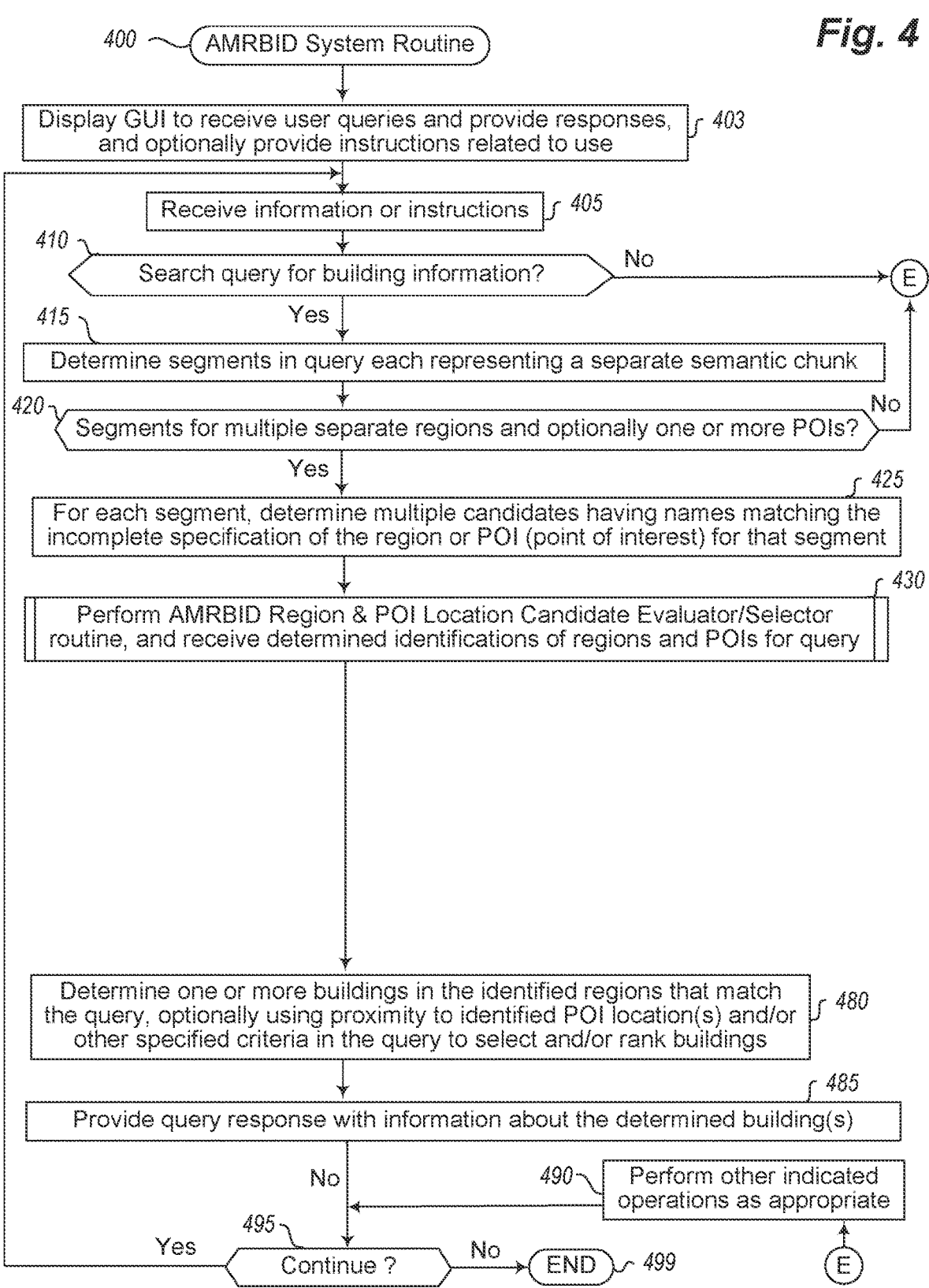

*Fig. 4*

400 — ( AMRBID System Routine )

Display GUI to receive user queries and provide responses, ⌐ 403
and optionally provide instructions related to use Receive information or instructions ⌐ 405

410 — Search query for building information? — No — Ⓔ

415 — Yes

Determine segments in query each representing a separate semantic chunk

420 — Segments for multiple separate regions and optionally one or more POIs? — No Yes ⌐ 425
For each segment, determine multiple candidates having names matching the
incomplete specification of the region or POI (point of interest) for that segment ⌐ 430
Perform AMRBID Region & POI Location Candidate Evaluator/Selector
routine, and receive determined identifications of regions and POIs for query Determine one or more buildings in the identified regions that match ⌐ 480
the query, optionally using proximity to identified POI location(s) and/or
other specified criteria in the query to select and/or rank buildings ⌐ 485
Provide query response with information about the determined building(s)

No

490 — Perform other indicated
operations as appropriate

495 —

Yes ——— Continue ? — No — ( END ) ⌐ 499                Ⓔ

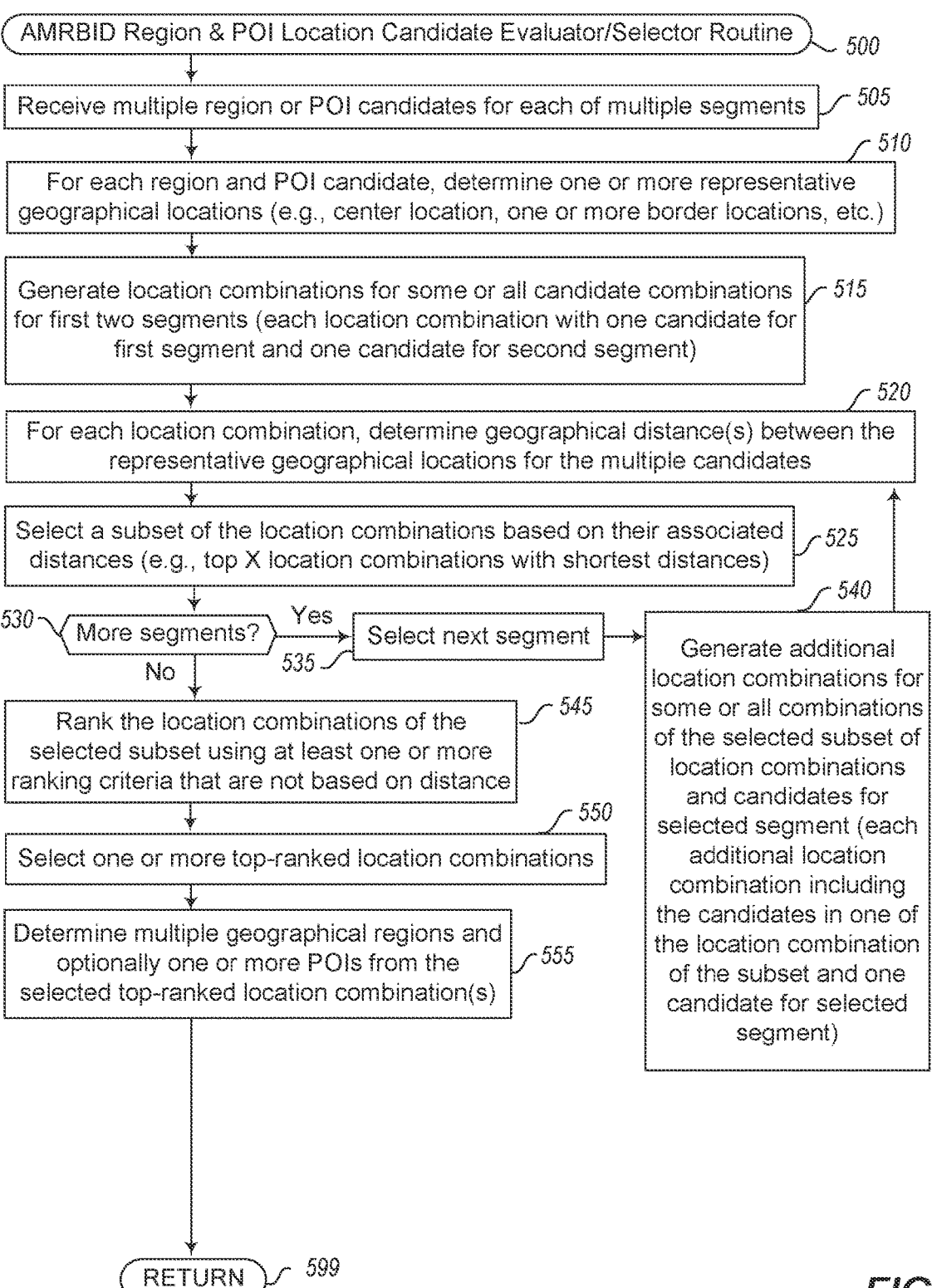

AMRBID Region & POI Location Candidate Evaluator/Selector Routine — 500

Receive multiple region or POI candidates for each of multiple segments — 505

For each region and POI candidate, determine one or more representative geographical locations (e.g., center location, one or more border locations, etc.) — 510

Generate location combinations for some or all candidate combinations for first two segments (each location combination with one candidate for first segment and one candidate for second segment) — 515

For each location combination, determine geographical distance(s) between the representative geographical locations for the multiple candidates — 520

Select a subset of the location combinations based on their associated distances (e.g., top X location combinations with shortest distances) — 525

530 — More segments? — Yes — Select next segment — 535

Generate additional location combinations for some or all combinations of the selected subset of location combinations and candidates for selected segment (each additional location combination including the candidates in one of the location combination of the subset and one candidate for selected segment) — 540

No

Rank the location combinations of the selected subset using at least one or more ranking criteria that are not based on distance — 545

Select one or more top-ranked location combinations — 550

Determine multiple geographical regions and optionally one or more POIs from the selected top-ranked location combination(s) — 555

RETURN — 599

FIG. 5

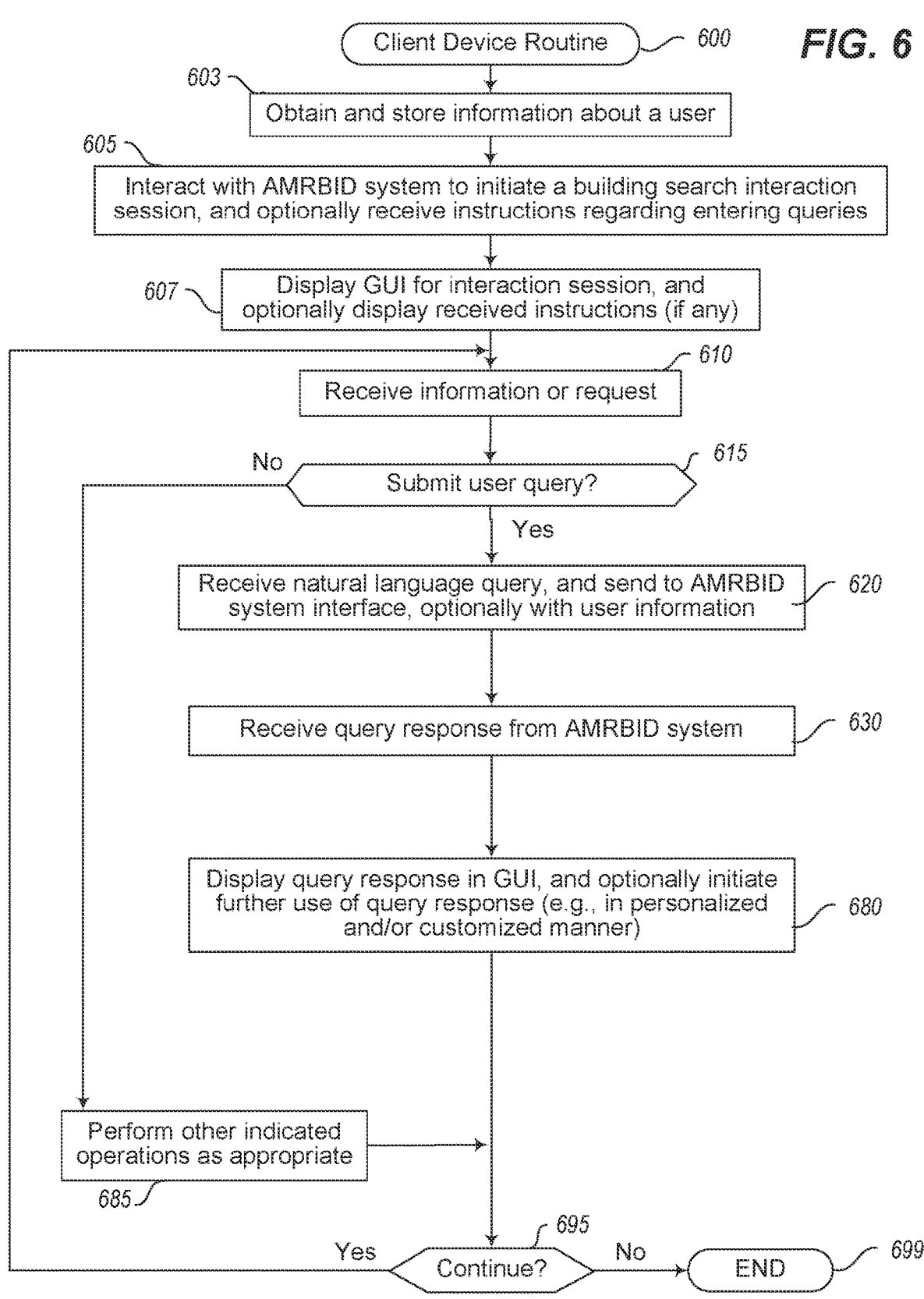

*FIG. 6*

Client Device Routine — 600

603 — Obtain and store information about a user

605 — Interact with AMRBID system to initiate a building search interaction session, and optionally receive instructions regarding entering queries 607 — Display GUI for interaction session, and optionally display received instructions (if any)

610 — Receive information or request

615 — Submit user query?     No

Yes

620 — Receive natural language query, and send to AMRBID system interface, optionally with user information 630 — Receive query response from AMRBID system 680 — Display query response in GUI, and optionally initiate further use of query response (e.g., in personalized and/or customized manner)

685 — Perform other indicated operations as appropriate

695 — Continue?     Yes     No

699 — END

AUTOMATED TOOL FOR DETERMINING AND PROVIDING BUILDING INFORMATION FOR MULTIPLE PARTIALLY DESCRIBED PROXIMATE GEOGRAPHICAL REGIONS

CROSS REFERENCE TO RELATED APPLICATIONS

This application claims the benefit of U.S. Provisional Patent Application No. 63/625,139, filed Jan. 25, 2024 and entitled "Automated Tool For Determining And Providing Building Information For Multiple Partially Described Proximate Geographical Regions," which is hereby incorporated by reference in its entirety.

TECHNICAL FIELD

The following disclosure relates generally to techniques for automatically determining and providing information about buildings in multiple proximate geographical regions in response to a query with partial descriptions of the regions and optionally partial descriptions of one or more additional locations in the regions, such as to automatically respond to a free-form natural language request having partial descriptions of names of multiple proximate geographical regions and of one or more point-of-interest locations by determining the intended geographical regions and point-of-interest locations and using them in generating corresponding response information.

BACKGROUND

An abundance of information is available to users on a wide variety of topics from a variety of sources. For example, portions of the World Wide Web ("the Web") are akin to an electronic library of documents and other data resources distributed over the Internet, with billions of documents available, including groups of documents directed to various specific topic areas (e.g., buildings of various types). In addition, various other information is available via other communication mediums. However, existing search engines and other techniques for identifying information of interest suffer from various problems. Non-exclusive examples include a difficulty in understanding natural language requests, difficulty in providing accurate information that is specific to a particular topic of interest, difficulty in limiting information requests to approved topics, etc.

BRIEF DESCRIPTION OF THE DRAWINGS

FIGS. 1A-1B are network diagrams illustrating an example system for performing described techniques, including automatically responding to a free-form natural language building information request having partial descriptions of names of multiple proximate geographical regions and in some cases partial descriptions of one or more additional locations in the regions by using automated tools to determine the intended regions and additional locations for use in generating and providing responsive building information.

FIGS. 2A-2E illustrate examples of performing described techniques, including automatically responding to a free-form natural language building information request having partial descriptions of names of multiple proximate geographical regions and in some cases partial descriptions of one or more additional locations in the regions by using automated tools to determine the intended regions and additional locations for use in generating and providing responsive building information.

FIG. 4 illustrates a flow diagram of an example embodiment of an Automated Multi-Region Building Information Determination ("AMRBID") system routine.

FIG. 5 illustrates a flow diagram of an example embodiment of an AMRBID Region & POI Location Candidate Evaluator/Selector component routine.

FIG. 6 illustrates a flow diagram of an example embodiment of a client device routine.

DETAILED DESCRIPTION

Figure 1A:
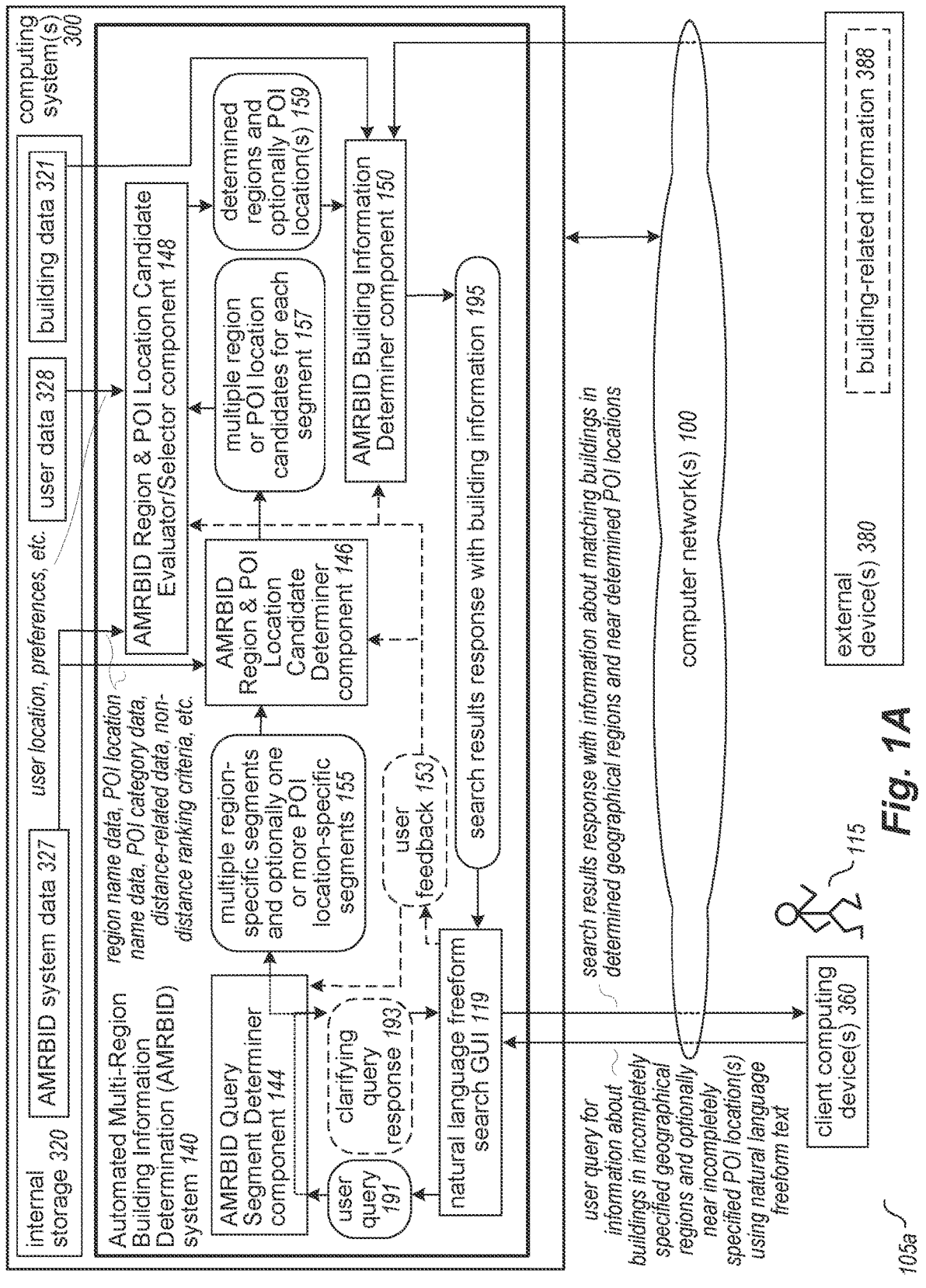

The present disclosure describes techniques for using computing devices to perform automated operations involving automatically determining and providing information about buildings in multiple geographical regions in response to a query with partial descriptions of the regions and optionally partial descriptions of one or more additional locations in the regions, such as to automatically respond to a free-form natural language request having partial descriptions of names of multiple proximate geographical regions and of one or more point-of-interest (POI) locations by determining the intended geographical regions and POI locations and using them in generating corresponding response information. In at least some embodiments, the described techniques include segmenting a sequence of multiple terms in a received free-form natural language query into multiple name-based indicator designations of geographical regions and in some cases POI locations, determining multiple candidate geographical regions matching each partially described geographical region name-based designation in a received query, determining multiple candidate POI (point of interest) locations matching each partially described POI location name-based designation in that query, doing inter-position distance filtering for at least some combinations of geographical region candidates and POI location candidates, further ranking a top group of such combinations of geographical region candidates and POI location candidates (e.g., those having the shortest inter-position distances) using one or more non-distance-based additional ranking criteria, selecting a top-ranked combination that has a candidate for each geographical region and POI location designation in the query, and further using those candidate geographical regions and POI location(s) for that selected combination to determine responsive information for the received query (e.g., by identifying buildings that are located in those candidate geographical regions of the top-ranked combination and that are near those candidate POI location(s) of the top-ranked combination and that optionally satisfy one or more additional selection criteria). Additional details are included below regarding automatically responding to a free-form natural language building information request having partial descriptions of multiple proximate geographical regions and in some cases partial descriptions of one or more additional POI locations in the regions by using automated tools to determine the intended regions and additional POI locations for use in generating and providing responsive building information, and some or all of the techniques described herein may, in at least some embodiments, be performed via automated operations of an Automated Multi-Region Building Information Determination ("AMRBID") system, as discussed further below.

As noted above, the automated operations of the AMR-BID system in at least some embodiments include, for a received query specified using free-form natural language and including name-based designations that partially describe names of multiple proximate geographical regions and in some cases one or more POI locations, segmenting a sequence of multiple terms in the received query into multiple name-based designations of geographical regions and in some cases POI locations. Such segmenting of the sequence of multiple terms may be performed in various manners in various embodiments, such as using a dictionary or other list of word/phrase breaks, by considering each combination of singleton terms and two or more adjacent terms to determine if they match geographical regions or POI locations (e.g., for a sequence of terms such as "Stamford New York", considering alternative name-based designations of "Stamford", "New", "York", "Stamford New", "New York", and "Stamford New York", and concluding that "New" is grouped with "York", leaving two segmented name-based designations of "Stamford" and "New York" for the query), etc. In some embodiments, each combination of terms is treated as a separate segment (e.g., for a sequence of terms such as "Stamford New York", using all of "Stamford", "New", "York", "Stamford New", "New York" and "Stamford New York" as separate segments). In addition, in some embodiments and situations, the received query may, in addition to the multiple segments each corresponding to a geographical region or a POI location, include one or more additional segments of one or more types, such as one or more of the following: POI categories (e.g., "beaches", "parks", etc.) that are not specific to particular POI locations; and/or non-location-related search filters or other search criteria, such as building-type designations (e.g., 'apartment', 'single family house', 'condominium', etc.) and/or other search criteria (e.g., minimum and/or maximum and/or target price, number of bathrooms, number of bedrooms, etc.), etc. Additional details are included below related to segmenting of a sequence of multiple terms of a received query that is specified using free-form natural language and that includes name-based designations partially describing names of multiple proximate geographical regions and in some cases one or more POI locations, including with respect to the non-exclusive examples of FIGS. 2A-2E.

As is also noted above, the automated operations of the AMRBID system in at least some embodiments include, for a received query specified using free-form natural language and separated into multiple segments each corresponding to a geographical region or a POI location, determining multiple candidate geographical regions matching each partially described geographical region name-based designation in a received query, and determining multiple candidate POI locations matching each partially described POI location name-based designation in that query. Such a query may, for example, include a name-based designation for each geographical region that includes a partial name of that geographical region without uniquely identifying a specific geographical region name, such as one of more of the following: a complete city name without a corresponding state or other larger area in which that city is located (e.g., "Madison" without any other indication of which of the 26 U.S. states that have a "Madison" city or town is intended); a partial city name without any other indication of which city is intended (e.g., "New" without indicating whether it means "New Orleans", "New Haven", "New Bedford", etc.); a partial or complete county name without a corresponding state or other larger area in which that county is located; a partial or complete non-city and non-country area name without a corresponding state or other larger area in which that area is located (e.g., a neighborhood, borough, parish, census tract, post office name, etc.); etc. Similarly, such a query may, for example, include a name-based designation for each POI location that includes a partial name of that POI location without uniquely identifying a specific POI location name, such as a partial or complete POI location name without a corresponding city or other geographical region in which that POI location is located, including for one or more of various types of POI locations: schools, lakes, beaches, parks, museums, hospitals, transportation-related spots such as parking lots and mass transit ports or other stops, landmarks, other businesses, etc. For each such name-based designation of a geographical region or POI location, the described techniques including determining some or all matching geographical regions or POI locations, respectively, for use as candidates for the actual intended respective geographical region or POI location, such as by searching one or more databases or other stored groups of information about geographical regions and POI locations, respectively, and in some embodiments using near matches (e.g., for a name-based designation such as "Bellevue" to also match alternative spellings such as "Belle Vue", "Bellvue", "Belleview", "Belle View", "Bellview", etc., such as identified using mappings of similar or commonly confused names and/or of homophones). In addition, if there are one or more segments in the query corresponding to a POI category, the described techniques may similarly determine multiple POI location candidates of that POI category and use them in the same manner as other POI location name-based designations, while in other embodiments such POI category segments may be used in other manners (e.g., to filter or rank particular building candidates that are later determined, such as to increase the ranking of buildings at or near POI locations of that POI category). Additional details are included below related to determining multiple candidate geographical regions matching each partially described geographical region name-based designation in a received query and determining multiple candidate POI locations matching each partially described POI location name-based designation in that query, including with respect to the non-exclusive examples of FIGS. 2A-2E.

As is also noted above, the automated operations of the AMRBID system in at least some embodiments include, after determining multiple candidate geographical regions matching each partially described geographical region name-based designation in a received query and determining multiple candidate POI locations matching each partially described POI location name-based designation in that query, doing inter-position distance filtering for at least some combinations of geographical region candidates and POI location candidates, such as to identify combinations of candidates that are proximate to each other. As one non-exclusive example, the performing of the inter-position distance filtering may include determining one or more representative geographical locations associated with each candidate region and candidate POI location (e.g., a centroid or other center geographical location, one or more geographical locations on a border of the region or POI location, etc.), generating some or all combinations of candidates for a first two region and/or POI location segments (referred to herein at times as "location combinations"), determining one or more distances of one of more types between the geographical locations associated with the candidates for each location combination (e.g., straight-line geodetic distances along the earth surface curvature, straight-line planar distances without consideration of earth surface curvature, driving distance, walking distance, etc.), selecting a subset of the location combinations with the shortest distances for further consideration (e.g., a top X, where X is a defined quantity threshold, such as 300; a top X %, where X is a defined percentage threshold, such as 1% or 5% or 10%; all location combinations with associated distances below a defined distance threshold, such as 10 miles or 100 miles or 1000 miles; etc.), and determining one or more representative geographical locations associated with each location combination of the subset (e.g., a centroid or other center for the multiple candidates of that location combination). While additional geographical region or POI location segments remain, the performing of the inter-position distance filtering may further include, for each additional segment, generating a new group of location combinations based on some or all combinations of the selected subset of location combinations and the candidates for the additional segment, determining one or more distances of one or more types between the one or more representative geographical locations associated with the prior location combination and the associated geographical location for the new additional segment candidate for each current location combination, selecting a subset of the current location combinations with the shortest determined distances for further consideration, and determining one or more representative geographical locations associated with each current location combination of the subset—this process is repeated for each additional segment, until a subset is selected of the final location combinations that each includes a candidate for each of the geographical region and POI location segments, along with an associated determined distance for that final location combination and one or more representative geographical locations associated with that final location combination. In addition, in some situations two geographical region candidates and/or POI location candidates of a location combination may include one candidate that is fully contained within another candidate (e.g., a POI location within a geographical region, a first geographical region within a second larger geographical region, etc.)—in at least some embodiments, in such situations the two geographical region candidates and/or POI location candidates are represented using a single geographical region and/or POI location (e.g., the smaller of the two, the larger of the two, etc.), and the inter-position distance between the two geographical region candidates and/or POI location candidates will be treated as zero, while in other embodiments such two geographical region candidates and/or POI location candidates with one candidate being fully contained may be handled in other manners. Additional details are included below related to doing inter-position distance filtering for some or all combinations of geographical region candidates and POI location candidates, including with respect to the non-exclusive examples of FIGS. 2A-2E.

As is also noted above, the automated operations of the AMRBID system in at least some embodiments include, after doing inter-position distance filtering for some or all combinations of geographical region candidates and POI location candidates, further ranking the subset of final location combinations (each having a candidate for each of the geographical region and POI location segments) based at least in part on one or more non-distance-based additional ranking criteria, and selecting one or more top-ranked final location combinations. Such additional ranking criteria may include, for example, one or more of the following non-exclusive criteria: population of each of the geographical regions in a final location combination, such as to improve the ranking of a final location combination as populations of its geographical regions increase; popularity of each of the geographical regions and/or POI locations in a final location combination, such as to improve the ranking of a final location combination as popularity of its geographical regions and/or POI locations increases; user location of a user who submitted the received query, such as to improve the ranking of a final location combination as distances between the user location and the representative location(s) of that final location combination decreases; one or more user preferences of a user who submitted the received query, such as to improve the ranking of a final location combination for closer matches between that final location combination and the user preference(s); etc. In at least some embodiments, assessments of the final location combinations based on one or more additional ranking criteria are combined with the determined distances associated with the final location combinations, such as in a weighted manner, including to select one or more top-ranked final location combinations. Additional details are included below related to ranking the subset of final location combinations and selecting one or more top-ranked final location combinations, including with respect to the non-exclusive examples of FIGS. 2A-2E.

As is also noted above, the automated operations of the AMRBID system in at least some embodiments include, after selecting one or more top-ranked final location combinations, using the candidate geographical regions and POI location(s) for the selected final location combination(s) to determine and provide responsive information for the received query, such as information about one or more identified buildings in the candidate geographical regions and proximate to the POI location(s). As one non-exclusive example, buildings may be identified that are located in the candidate geographical regions of the selected final location combination(s) and that further satisfy any additional optional specified non-location-related search filters or other search criteria (e.g., included in the received query). The identified buildings may be further filtered and/or ranked in various manners, such as using one or more of the following: proximity to POI locations in the selected final location combination(s); proximity to POI locations corresponding to any POI location categories specified in the query; one or more additional non-location-related search filters or other search criteria specified in the query; one or more user preferences of a user who submitted the received query, such as to improve the ranking of a final location combination for closer matches between that final location combination and the user preference(s); etc. After such filtering and/or ranking, a subset of one or more of the remaining identified buildings may further be selected in some embodiments (e.g., a top Y, where Y is a defined quantity threshold, such as 1 or 10 or 100; a top Y %, where Y is a defined percentage threshold, such as 1% or 5% or 10%; etc.), while in other embodiments all remaining identified buildings may be selected—if multiple such identified buildings are selected, they may be further provided in a ranked manner, such as with a highest-ranked building first. Responsive information for the query that includes the one or more identified buildings may further be provided in various manners in various embodiments, such as in a GUI (graphical user interface) displayed to a user who submitted the query via the GUI. In addition, it will be appreciated that various types of information may be provided for an identified building, such as images, textual descriptions, 3D models and other floor plans, prices, statistical data (e.g., square feet, quantity of bedrooms and bathrooms, etc.), videos, comments and other user-generated data, etc. Additional details are included below related to determining and providing responsive information for the received query, such as information about one or more identified buildings in the candidate geographical regions and proximate to the POI location(s), including with respect to the non-exclusive examples of FIGS. 2A-2E.

The described automated techniques provide various benefits in various embodiments, including to significantly improve the identification and use of responsive information to specified queries for information about buildings, including queries specified in a natural language format, and such as to more accurately determine the intended geographical regions and POI locations based on incomplete partial name-based designations of those geographical regions and POI locations. Such automated techniques also allow such responsive answer information to be generated much more quickly and efficiently than previously existing techniques (e.g., using less storage and/or memory and/or computing cycles) and with greater accuracy, based at least in part on using the described techniques for determining intended geographical regions and POI locations using the received partial name-based designations that do not uniquely identify those intended geographical regions and POI locations (e.g., by using a search that successively adds additional segment candidates to a group of top location combinations for two or more prior segments), etc. In addition, in some embodiments the described techniques may be used to provide an improved GUI in which a user may more accurately and quickly obtain information, including in response to an explicit request (e.g., in the form of a natural language query), as part of providing personalized information to the user, etc. Various other benefits are also provided by the described techniques, some of which are further described elsewhere herein.

FIGS. 1A-1B are network diagrams illustrating an example system for performing described techniques, including automatically responding to a free-form natural language building information request having partial descriptions of names of multiple proximate geographical regions and in some cases partial descriptions of one or more additional locations in the regions by using automated tools to determine the intended regions and additional locations for use in generating and providing responsive building information.

In particular, FIG. 1A illustrates information 105a about an example embodiment of an AMRBID system 140 executing on one or more computing systems 300, and interacting over one or more computer networks 100 with one or more client computing devices 360, such as to receive query requests from users 115 of the client computing devices for information about buildings and to provide corresponding responses with requested building information (e.g., as part of search results). In the illustrated embodiment, the computing systems 300 may store various information on storage 320 that is used by the AMRBID system during operation, including a group of building data 321 about buildings in various geographical regions (e.g., in one or more countries), user data 328 (e.g., user location; user preferences, such as expressly specified and/or implicitly determined from past activities of the user such as viewing or otherwise interacting with information about buildings; etc.), and AMRBID system data 327 (e.g., stored in one or more databases, such as about names of geographical regions, names of POI locations, information about POI categories and associated POI locations, data for use in determining distances of one or more types between two or more geographical locations, information for use in one or more non-distance-based ranking criteria such as geographical region populations and/or popularity data for geographical regions and/or POI locations, information for use in segment determination such as word-break and/or phrase-break vocabularies, etc.). The AMRBID system may further use other building-related information 388 stored externally to the computing systems 300, such as accessed over the one or more computer networks 100 from one or more external computing and/or storage devices 380, whether in addition to or instead of information stored on storage 320.

As one example of operations of the AMRBID system 140, a particular user 115 of one of the client computing devices 360 may supply a query 191 about buildings of interest to a natural language free-form input GUI 119 provided by the AMRBID system. The GUI provides the user query to an AMRBID Query Segment Determiner component 144, which analyzes the user query to attempt to identify multiple segments within the query corresponding to two or more geographical regions and optionally one or more POI locations, such as with each segment having a name-based designation that provides a partial description of a geographical region or POI location—if the component is unable to identify such segments, such as due to the received query lacking a correct format or types of information or due to having other problems, the component instead generates and returns a clarifying query response 193 to the GUI 119 to request further information from the user. Otherwise, the component 144 forwards the determined multiple region-specific segments and optionally one or more POI location-specific segments 155 to the AMRBID Region and POI Location Candidate Determiner component 146, which uses information from the system data 327 to determine multiple candidates for each of the geographical region and/or POI location segments that match the respective name-based designations for those segments, and to provide such candidates 157 to the AMRBID Region and POI Location Candidate Evaluator/Selector component 148. The component 148 uses the system data 327 as well as optionally user data 328 to evaluate some or all combinations of the candidates in order to identify the intended specific geographical regions and POI locations for the query-FIG. 1B provides further details related to one example embodiment of such a component 148. The component 148 then provides those identified geographical regions and optionally POI locations to the AMRBID Building Information Determiner component 150, which uses the building data 321 and optionally user data 328 to identify one or more buildings in those geographical regions and optionally near those POI locations for use as part of search results response 195.

After the final query response 195 with the building information is generated by the component 150, or if the component 144 instead generates a clarifying query response 193 without forwarding the user query segments 155 to the component 146, the generated query response 195 or 193 is provided via the GUI 119 to the client computing device of the user who submitted the query, such as for display on the client computing device as part of the GUI. The same user may then provide one or more subsequent queries 191 to the GUI 119 as part of an ongoing interaction session, such as with similar processing performed for the subsequent user queries, and optionally with the context of prior interactions during the session being maintained. In addition, a user may in some embodiments and situations provide optional user feedback 153, such as to indicate that incorrect geographical regions and/or POI locations have been determined for the user query, or to otherwise provide feedback regarding accuracy of search results response 195 or to provide further clarifying information in response to a clarifying query response 193. If so, such optional user feedback 153 may be forwarded to the components 144 and/or 146 and/or 148 and/or 150, such as to improve future determinations performed by the components. In other embodiments and situations, some or all such feedback may instead be implicit feedback that is determined based on an analysis of subsequent user queries (e.g., to indicate that a prior query response did not provide information that the user was seeking) and/or of prior user queries (e.g., to determine user preferences and/or user location, such as based on patterns in the prior user queries). While the example discussed above involves a single user performing multiple interactions with the AMRBID system as part of an interaction session (e.g., spanning seconds, minutes, hours, days, etc.), it will be appreciated that the AMRBID system may in at least some embodiments and situations be concurrently interacting with many users using different client computing devices, such as to maintain a separate GUI and interaction session history for each such user, and that a new interaction session may be initiated for a user after one or more prior interaction sessions with that user in various manners (e.g., based on a corresponding user instruction, such as to reflect a change in the types of building information of interest; as determined automatically by the AMRBID system, such as to reflect a change in the types of building information being requested, or due to a defined period of time since a last user interaction being exceeded, such as one or more days; etc.).

Figure 3:
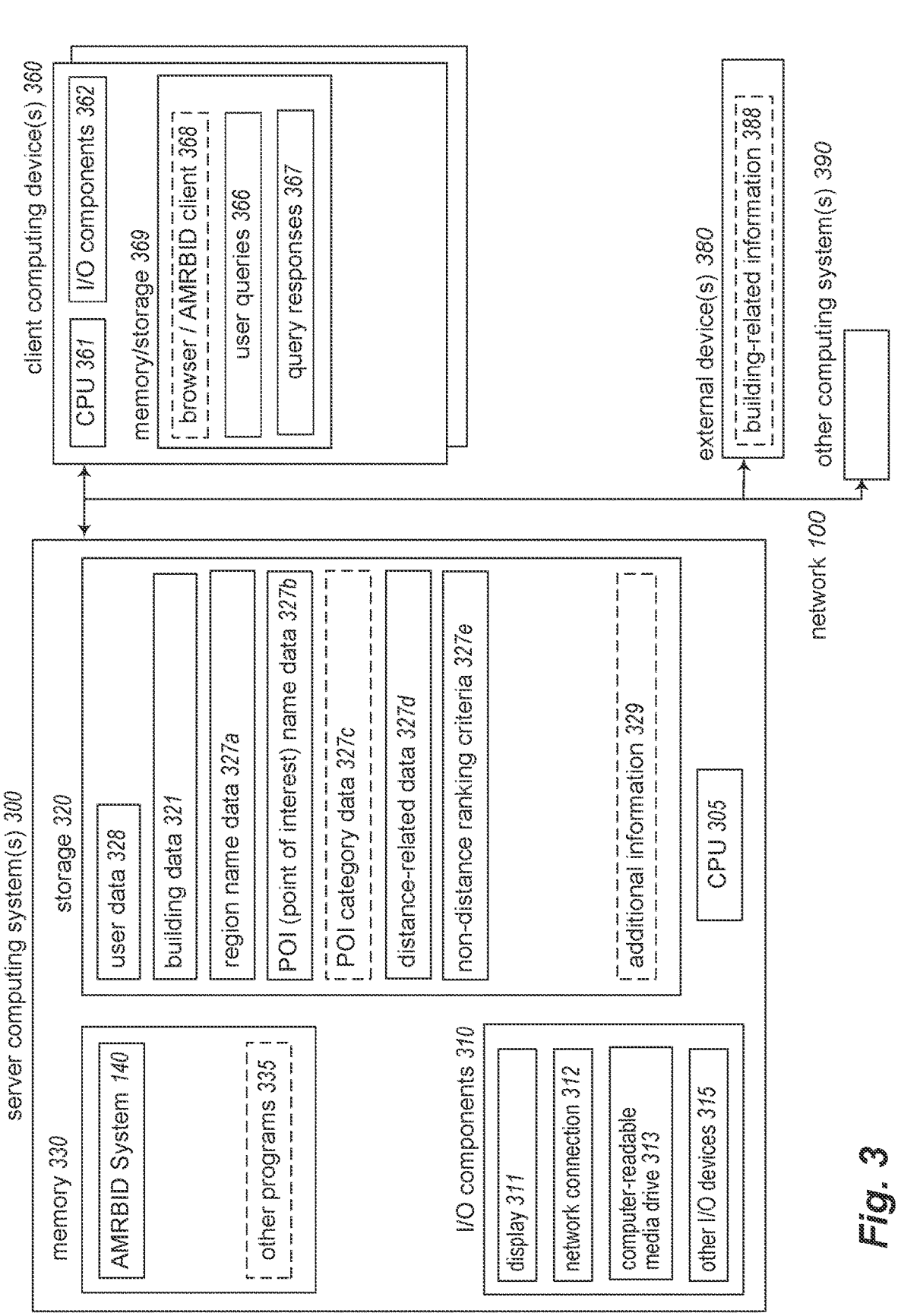
FIG. 3 is a block diagram illustrating an example of a computing system for use in performing described techniques, including automatically responding to a free-form natural language building information request having partial descriptions of names of multiple proximate geographical regions and in some cases partial descriptions of one or more additional locations in the regions by using automated tools to determine the intended regions and additional locations for use in generating and providing responsive building information.

In addition, the computing system(s) 300 may include various other components and functionality, as discussed in greater detail elsewhere herein, including with respect to FIG. 3. The computer networks 100 may similarly be of various types in various embodiments and may include various types of wired and/or wireless segments, including one or more publicly accessible linked networks (e.g., operated by various distinct parties, such as the Internet) and/or a private network (e.g., a corporate or university network that is wholly or partially inaccessible to non-privileged users), including in some cases to have both private and public networks (e.g., with one or more of the private networks having access to and/or from one or more of the public networks).

FIG. 1B continues the example of FIG. 1A, and illustrates information 105*b* for one example embodiment of the AMR-BID Region and POI Location Candidate Evaluator/Selector component 148 discussed in FIG. 1A. In particular, in the illustrated embodiment, the component 148 performs various activities to evaluate some or all combinations of the geographical region and POI location candidates for a query in order to identify the intended specific geographical regions and POI locations for the query. In operation, the component 148 receives as input multiple geographical region and POI location candidates 157 for each determined segment in a query, such as from component 146. In step 162, the component determines, for each geographical region and POI location candidate, one or more representative geographical locations for that region or POI location, such as to correspond to a centroid or other center of the region or POI location (or in the case of a POI location that corresponds to a single geographical location, to use that geographical location), or to one or more other geographical locations such as one or more border locations for the geographical region or POI location. In block 164, the component then generates location combinations for some or all combinations of candidates for the first two segments received in the query, with each location combination having one candidate for the first segment and one candidate for the second segment. In block 166, the component then determines, for each location combination, one or more geographical distances between the representative geographical locations for the multiple candidates included in that location combination, such as to determine a single distance of a single type in some embodiments and situations (e.g., straight-line geodetic or planar distance). In block 168, the component then selects a subset of the location combinations based on the determined distances for those location combinations, such as to select a top quantity or percentage of the location combinations with the shortest distances. In block 170, the component then determines if there are more segments that have not yet been analyzed for the generated location combinations, and if so continues to block 172 to select the next such segment, and then to block 174 to generate additional location combinations for some or all combinations of the prior location combinations of the selected subset and the candidates for the selected next segment, with each additional combination including the candidates from one of the prior location combinations of the subset and an additional candidate for the selected next segment. After block 174, the processing returns to block 166 and 168 to determine geographical distances for and select a subset of the additional location combinations generated in block 174. This loop continues until all geographical region and POI location segments have been processed. While the illustrated example component performs the evaluation of the location combinations in multiple successive iterations for each segment after the first two (e.g., using beam searching techniques), such as to conserve memory and/or increase processing speed, in other embodiments some or all combinations of all candidates for all segments may be evaluated simultaneously.

If it is instead determined in block 170 that there are no more segments from the query that have not yet been analyzed, the component in block 176 ranks the selected location combinations of the subset for the last pass in block 168, such as based on a combination of the associated distance determined in block 166 for that location combination and one or more other ranking criteria that are not based on distance, such as using information from user data 328, building data 321, and/or system data 327. The component in block 178 then selects one or more top-ranked location combinations, and in block 180 determines the multiple geographical regions and optionally one or more POI locations for the query from the selected top-ranked location combination(s), which are provided as output in block 159.

It will be appreciated that various details are provided with respect to FIGS. 1A-1B for illustrative purposes, and are not intended to limit the scope of the invention unless otherwise indicated. Similarly, additional exemplary details are provided with respect to FIGS. 2A-2E and elsewhere herein, and such details are similarly provided for illustrative purposes and are not intended to limit the scope of the invention unless otherwise indicated.

FIGS. 2A-2E illustrate examples of performing described techniques, including automatically responding to a free-form natural language building information request having partial descriptions of names of multiple proximate geographical regions and in some cases partial descriptions of one or more additional locations in the regions by using automated tools to determine the intended regions and additional locations for use in generating and providing responsive building information.

In particular, FIG. 2A illustrates information 205*a* including an example client computing device 360 (in this example, a smartphone) that is being used by a user (not shown) to interact with a GUI provided by the AMRBID system, with current information 206 displayed in the GUI. In this example, an initial greeting screen is shown that includes a user selectable control 210*a* via which a user may sign in, as well as instructions regarding how to supply queries via the GUI. In this example, the user begins by entering an initial query 215*a* that includes a sequence of 4 terms of "Bellevue Redmond Woodridge Elementary". The AMRBID system generates response information 220*a* that includes search results with a list of matching buildings along with summary information about those buildings, as well as information 217*a* that indicates the specific geographical regions and POI locations that were identified using the incompletely specified user query, along with a user selectable control 218*a* that the user may use to provide feedback if the identified geographical regions and/or POI location(s) are not correct. As mentioned on the right side of FIG. 2A, and discussed in greater detail with respect to FIGS. 2C-2E, the AMRBID system considers a variety of candidates for each of the geographical regions and the POI location that are partially indicated in the 3 name-based designations of "Bellevue", "Redmond" and "Woodridge Elementary" of query 215*a*. FIG. 2A further illustrates an additional user query 215*b*, such as may be supplied by the user if the results from the initial user query 215*a* are incomplete or otherwise incorrect, or alternatively may be used as an initial query instead of query 215*a*—in this example the user query 215*b* is similar to the user query 215*a*, but includes a third geographical region at the end of the query, and with similar search results building information 220*b* and an indication of the determined geographical regions and POI location used for the search.

FIG. 2B continues the example of FIG. 2A, and illustrates additional user queries that may be specified in information 205*b*, whether in addition to or instead of the user queries 215*a* and/or 215*b* of FIG. 2A. In particular, the example user queries of FIG. 2B include a user query 215*c* that is similar to that of user query 215*a*, but includes a second POI location at the end of the query, and with similar search results building information 220*c* shown along with an indication of the determined geographical regions and POI locations used for the search. In addition, the example user queries of FIG. 2B also include a user query 215*d* that is similar to that of user query 215*a*, but includes an additional segment at the end of the user query that provides a filtering criteria indicating the type of building for which information is requested (in this case, apartments), with the additional information used to filter the matching building information that is provided in the search results building information 220*d* shown along with an indication of the determined geographical regions and POI locations used for the search, but not used as a separate segment for purposes of creating the location combinations in the same manner as the segments for the geographical regions and POI location. In addition, the example of FIG. 2B illustrates 210*b* that a user has used the control 210*a* of FIG. 2A to login, with the top of the GUI screen updated to reflect an identification of the current user and their current location—as discussed in greater detail elsewhere herein, the identification of such a user may further be used to filter and/or rank search results, such as based on user location and/or other information associated with the user.

FIGS. 2C-2E continues the examples of FIGS. 2A-2B, and provide further details regarding operations of the AMRBID system in generating the search results from the user query. In particular, FIG. 2C includes information 205*c* that indicates the initial user query 215*a*, as well as that initial processing by the system has determined that the user query includes three segments, with the first two segments of "Bellevue" and "Redmond" corresponding to geographical regions and the third segment of "Woodridge Elementary" corresponding to a POI location (in this example, an elementary school)—as discussed in greater detail elsewhere herein, the segmenting operations may consider alternatives such as "Bellevue" and "Redmond" being grouped together as a single segment, and terms such as "Woodridge" and "Elementary" being considered as separate segments. FIG. 2C further illustrates processing performed in determining multiple candidates for each of the segments, including a variety of candidates 225*a* for the "Bellevue" geographical region that include different cities named "Bellevue" or that includes the term "Bellevue" in their name, other geographical region names similar to "Bellevue", non-city geographical regions that include the name "Bellevue", etc. A similar group of multiple candidates 225*b* are determined for the "Redmond" geographical region, and multiple candidates 225*c* are determined for the "Woodridge Elementary" POI location. In the illustrated example, the candidates 225*a*, 225*b* and 225*c* are each also shown with an associated geographical location that is determined as a representative location for that geographical region or POI location.

FIG. 2C further illustrates that the candidates 225*a* and 225*b* for the first two segments are combined to generate a variety of initial location combinations 230*a*, such as for all combinations of the candidates for the first two segments (although only a subset of all of the combinations are shown for brevity), as well as being shown with a distance determined for each location combination between the associated geographical locations for the two candidates included in that location combination. As is illustrated in this example, the determined distance can vary greatly, such as a small distance of 5.8 miles between two proximate adjacent cities for a first of the location combinations, to almost 2000 miles for location combinations in which the two candidate geographical regions for that location combination are in non-proximate and widely separated areas of the country. As part of the continuing processing by the AMRBID system, and after generating the location combinations 230*a* and their associated determined distances, the system further selects a subset of the location combinations for further processing, such as in this example to select a quantity or percentage of the location combinations with the shortest distances (e.g., a quantity of 300 results with the shortest distances), with four of the selected subset being illustrated in bold 222.

FIG. 2D continues the examples of FIGS. 2A-2C, and includes information 205*d* that illustrates some of the selected subset 230*b* of the location combinations 230*a*, which are sorted in this example by the associated determined distances, and which are further shown with a determined associated geographical location for the multiple geographical regions in the location combination (e.g., a centroid or other center location). In addition, FIG. 2D further illustrates the candidates 225c for the third segment of the user query, and additional location combinations 230c that are generated to include some or all combinations of the prior selected subset of location combinations and the additional candidates 225c, such as with the first illustrated additional location combination being the first selected subset prior location combination and the first candidate 225c, with the second illustrated additional location combination being the same first prior location combination and the second candidate 225c, etc. In a manner similar to that of the initial location combinations 230a, the additional location combinations 230c further each include a determined distance between the associated geographical locations for the prior location combination and for the newly added candidate, although in other embodiments separate representative geographical locations may be maintained for each candidate, with the determined distance for the additional combination being an average of all those separate representative geographical locations. As part of the continuing processing by the AMRBID system, and after generating the additional location combinations 230c and their associated determined distances, the system further selects a subset of the additional location combinations for further processing, such as in this example to select a quantity or percentage of the additional location combinations with the shortest distances (e.g., a quantity of 300 results with the shortest distances), with three of the selected subset being illustrated in bold 232.

FIG. 2E continues the examples of FIGS. 2A-2D, and includes information 205e that illustrates some of the selected subset 230d of the additional location combinations 230c, which are sorted in this example by an associated ranking determined for each of the additional location combinations of the selected subset. In particular, in this example, multiple factors are combined to determine a ranking for each of the additional location combinations, including a determined distance for that additional location combination, one or more indications of population size for that additional location combination (e.g., separate populations for each geographical region or an aggregate representation of multiple such populations, with larger populations improving the ranking in this example, and shown in this example as a relative ranking rather than numerical population sizes), one or more indications of popularity for the geographical regions and/or POI location(s) of that additional location combination (e.g., separate popularity scores for each geographical region and/or POI location or an aggregate representation of popularity for multiple such geographical regions and/or POI locations, with higher popularities improving the ranking in this example, and shown in this example as a relative ranking rather than numerical popularity score), an indication of proximity to the location of the user for the representative geographical location(s) of the additional location combination (e.g., such as with shorter distances improving the ranking in this example, and shown in this example as a relative ranking rather than numerical distance), etc. In this example, the single top-ranked additional location combination is selected for further use, as reflected in the geographical regions and POI location 250 that are determined to correspond to the received user query 215a. It will be appreciated that the examples of FIGS. 2A-2E are provided for illustrative reasons only, and are not intended to limit the scope of the invention.

For illustrative purposes, some embodiments are described herein in which specific types of information are acquired, used and/or presented in specific ways using specific types of data structures and by using specific types of devices-however, it will be understood that the described techniques may be used in other manners in other embodiments, and that the invention is not limited to exemplary details provided. As one non-exclusive example, specific types of data structures and algorithms (e.g., beam searches) are generated and/or used in specific manners in some embodiments, but it will be appreciated that other types of information may be generated and used in other manners in other embodiments, including for types of information other than building information. Similarly, while particular user interface display and interaction techniques are shown, other user interaction techniques may be used in other embodiments. In addition, various details are provided in the drawings and text for exemplary purposes, but are not intended to limit the scope of the invention—for example, sizes and relative positions of elements in the drawings are not necessarily drawn to scale, with some details omitted and/or provided with greater prominence (e.g., via size and positioning) to enhance legibility and/or clarity, and identical reference numbers may be used in the drawings to identify the same or similar elements or acts.

FIG. 3 is a block diagram illustrating an embodiment of one or more server computing systems 300 executing an implementation of an AMRBID system 140, such as in a manner similar to that of FIGS. 1A-1B and with additional hardware details illustrated—the server computing system(s) and AMRBID system may be implemented using a plurality of hardware components that form electronic circuits suitable for and configured to, when in combined operation, perform at least some of the techniques described herein. In the illustrated embodiment, each server computing system 300 includes one or more hardware central processing units ("CPU") or other hardware processors 305, various input/output ("I/O") components 310, storage 320, and memory 330, with the illustrated I/O components including a display 311, a network connection 312, a computer-readable media drive 313, and other I/O devices 315 (e.g., keyboards, mice or other pointing devices, microphones, speakers, GPS receivers, etc.).

The server computing system(s) 300 and executing AMRBID system 140 may communicate with other computing systems and devices via one or more networks 100 (e.g., the Internet, one or more cellular telephone networks, etc.), such as user client computing devices 360 (e.g., used to supply queries; receive responsive answers; and use the received answer information, such as to display or otherwise present answer information to users of the client computing devices and/or to implement further automated activities, such as to access other functionality provided by the AMRBID system), optionally other external devices 380 (e.g., used to store and provide building information of one or more types), and optionally other computing systems 390.

In the illustrated embodiment, an embodiment of the AMRBID system 140 executes in memory 330 in order to perform at least some of the described techniques, such as by using the processor(s) 305 to execute software instructions of the system 140 in a manner that configures the processor(s) 305 and computing system 300 to perform automated operations that implement those described techniques. The illustrated embodiment of the AMRBID system may include one or more components, not shown, to each perform portions of the functionality of the AMRBID system, and the memory may further optionally execute one or more other programs 335. The AMRBID system 140 may further, during its operation, store and/or retrieve various types of data on storage 320 (e.g., in one or more databases or other data structures), such as various types of user data 328, building data 321, region name data 327*a*, POI name data 327*b*, optionally POI category data 327*c*, distance-related data 327*d*, data 327*e* for non-distance-based ranking criteria, AMRBID system data 327, and/or various other types of optional additional information 329.

Some or all of the user client computing devices 360 (e.g., mobile devices), external devices 380, and other computing systems 390 may similarly include some or all of the same types of components illustrated for server computing system 300. As one non-limiting example, the computing devices 360 are each shown to include one or more hardware CPU(s) 361, I/O components 362, and memory and/or storage 369, with a browser and/or AMRBID client program 368 optionally executing in memory to interact with the AMRBID system 140 and present or otherwise use query responses 367 that are received from the AMRBID system for submitted user queries 366. While particular components are not illustrated for the other devices/systems 380 and 390, it will be appreciated that they may include similar and/or additional components.

It will also be appreciated that computing system 300 and the other systems and devices included within FIG. 3 are merely illustrative and are not intended to limit the scope of the present invention. The systems and/or devices may instead each include multiple interacting computing systems or devices, and may be connected to other devices that are not specifically illustrated, including via Bluetooth communication or other direct communication, through one or more networks such as the Internet, via the Web, or via one or more private networks (e.g., mobile communication networks, etc.). More generally, a device or other computing system may comprise any combination of hardware that may interact and perform the described types of functionality, optionally when programmed or otherwise configured with particular software instructions and/or data structures, including without limitation desktop or other computers (e.g., tablets, slates, etc.), database servers, network storage devices and other network devices, smart phones and other cell phones, consumer electronics, wearable devices, digital music player devices, handheld gaming devices, PDAs, wireless phones, Internet appliances, and various other consumer products that include appropriate communication capabilities. In addition, the functionality provided by the illustrated AMRBID system 140 may in some embodiments be distributed in various components, some of the described functionality of the AMRBID system 140 may not be provided, and/or other additional functionality may be provided.

It will also be appreciated that, while various items are illustrated as being stored in memory or on storage while being used, these items or portions of them may be transferred between memory and other storage devices, such as for purposes of execution, memory management, data integrity, etc. Alternatively, in other embodiments some or all of the software components and/or systems may execute in memory on another device and communicate with the illustrated computing systems via inter-computer communication. Thus, in some embodiments, some or all of the described techniques may be performed by hardware means that include one or more processors and/or memory and/or storage when configured by one or more software programs (e.g., by the AMRBID system 140 executing on server computing systems 300) and/or data structures, such as by execution of software instructions of the one or more software programs and/or by storage of such software instructions and/or data structures, and such as to perform algorithms as described in the flow charts and other disclosure herein. Furthermore, in some embodiments, some or all of the systems and/or components may be implemented or provided in other manners, such as by consisting of one or more means that are implemented partially or fully in firmware and/or hardware (e.g., rather than as a means implemented in whole or in part by software instructions that configure a particular CPU or other processor), including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the components, systems and data structures may also be stored (e.g., as software instructions or structured data) on a non-transitory computer-readable storage mediums, such as a hard disk or flash drive or other non-volatile storage device, volatile or non-volatile memory (e.g., RAM or flash RAM), a network storage device, or a portable media article (e.g., a DVD disk, a CD disk, an optical disk, a flash memory device, etc.) to be read by an appropriate drive or via an appropriate connection. The systems, components and data structures may also in some embodiments be transmitted via generated data signals (e.g., as part of a carrier wave or other analog or digital propagated signal) on a variety of computer-readable transmission mediums, including wireless-based and wired/cable-based mediums, and may take a variety of forms (e.g., as part of a single or multiplexed analog signal, or as multiple discrete digital packets or frames). Such computer program products may also take other forms in other embodiments. Accordingly, embodiments of the present disclosure may be practiced with other computer system configurations.

FIG. 4 is a flow diagram of an example embodiment of an AMRBID system routine 400. The routine may be provided by, for example, execution of the AMRBID system 140 of FIGS. 1A-1B, and/or the AMRBID system 140 of FIG. 3, and/or corresponding functionality discussed with respect to FIGS. 2A-2E and elsewhere herein, such as to perform automated operations related to automatically responding to a free-form natural language building information request having partial descriptions of names of multiple proximate geographical regions and in some cases partial descriptions of one or more additional locations in the regions by using automated tools to determine the intended regions and additional locations for use in generating and providing responsive building information. In the illustrated embodiment, the routine interacts with a single user at a time to provide building response information to user queries from that user, but it will be appreciated that the routine may interact in a similar manner with multiple users (e.g., sequentially or concurrently), and that the routine may in other embodiments perform similar types of activities for other types of information.

In the illustrated embodiment, the routine 400 begins at 403, where it displays a GUI (e.g., on a client device of a user, such as by transmitting information from one or more server devices to the client device for display) to receive user queries and provide responses for a particular user, as well as to optionally provide overview instructions to the user, and then continues to block 405 to wait for instructions or other information. After instructions or other information are received in block 405, the routine continues to block 410 to determine if the instructions or other information are a search query for a building information, and if not continues to block 490. Otherwise, the routine continues to block 415 to attempt to determine segments in the query that each represents a separate semantic chunk, and in block 420 determines if the routine was able to determine segments for multiple separate geographical regions and optionally one or more POI locations that each includes an incomplete name-based designation for a respective geographical region or POI location. If not, the routine continues to block 490, and otherwise continues to perform blocks 425-485 to generate and provide a response to the user query. In particular, in block 425, and for each determined segment in the user query corresponding to a geographical region or a POI location, the routine determines multiple candidates having names matching the incomplete specification of the name-based designation for the geographical region or POI location for that segment. In block 430, the routine then performs the AMRBID Region and POI Location Candidate Evaluator/Selector routine to evaluate various combinations of the candidates and to determine and select one or more top-ranked combinations of a geographical region for each geographical region segment and a POI location for each POI location segment. In block 480, the routine then determines one or more buildings in the identified geographical regions that match the query, optionally using proximity to identified POI locations for the query and/or other specified filtering or ranking criteria in the query to select and or rank the identified buildings. In block 485, the routine then provides a query response with the information about the determined one or more buildings, such as by causing display of that query response in the displayed GUI. The illustrated embodiment of the routine does not generate and provide clarifying query responses in the manner discussed with respect to FIG. 1A, but in other embodiments may do so.

If it is instead determined in blocks 410 or 420 that the received instructions or other information is not a user query with multiple incomplete name-based designations for geographical regions and optionally one or more incomplete name-based designations for POI locations, the routine in block 490 proceeds to perform one or more other indicated operations as appropriate, with non-exclusive examples of such other operations including retrieving and providing previously determined or generated information (e.g., previous user queries, previously determined responses to user queries, etc.), receiving and storing information for later use (e.g., information about building data 321, user data 328, AMRBID system data 327, etc.), responding to other types of search queries (e.g., with one or more geographical regions that are fully specified), receiving and using feedback from a user in response to provided query responses in block 485, providing information about how one or more previous query responses were determined, performing housekeeping operations, etc.

After blocks 485 or 490, the routine continues to block 495 to determine whether to continue, such as until an explicit indication to terminate is received (or alternatively only if an explicit indication to continue is received). If it is determined to continue, the routine returns to block 405 to await further information or instructions from the same user (or alternatively to return to block 403 to begin interactions with a different user), and if not continues to block 499 and ends.

FIG. 5 is a flow diagram of an example embodiment of an AMRBID Region and POI Location Candidate Evaluator/Selector routine 500. The routine may be provided by, for example, execution of the AMRBID Region and POI Location Candidate Evaluator/Selector component 148 of FIGS.

1A-1B and/or a corresponding component (not shown) of the AMRBID system 140 of FIG. 3 and/or with respect to corresponding functionality discussed with respect to FIGS. 2A-2E and elsewhere herein, such as to identify the intended specific geographical regions and POI locations for the query. In addition, in at least some situations, the routine 500 may be performed based on execution of block 430 of FIG. 4, with resulting information provided and execution control returning to that location when the routine 500 ends—in other embodiments, the routine may be invoked in other manners. In this example, the routine 500 is performed using particular types of searching techniques (e.g., beam searching), but in other embodiments may use other types of searching techniques, whether in addition to or instead of the illustrated types of searching techniques.

The illustrated embodiment of the routine 500 begins at block 505, where multiple candidates are received for each geographical region and POI location of the multiple segments in the user query. In block 510, the routine then, for each candidate, determines one or more representative geographical locations, such as a center location, one or more border locations, etc. In block 515, the routine then generates initial location combinations for some or all combinations of candidates for the first two segments, with each location combination including one candidate for the first segment and one candidate for the second segment—in other embodiments, two segments to initially use may be selected in other manners than the order entered (e.g., randomly). In block 520, for each location combination, the routine then determines one or more geographical distances of one or more types between the representative geographical locations for the multiple candidates in that location combination, such as to determine a single straight-line geodetic or planar distance. In block 525, the routine then selects a subset of the location combinations based on their associated distances, such as a defined quantity of the location combinations with the shortest distances (e.g., the top 300). In block 530, the routine then determines if there are more segments to be processed, and if so continues to block 535 to select the next additional segment, and then proceeds to block 540 where it generates additional location combinations for some or all combinations of the selected subset of prior location combinations and the candidates for the selected next additional segment, with each additional location combination including the multiple candidates from one of the prior location combinations of the subset and an additional candidate for the selected next additional segment. After block 540, the routine returns to perform blocks 520 and 525 for the generated additional location combinations.

If it is instead determined in block 530 that there are not more segments to process, the routine continues instead to block 545 where it ranks the selected subset of the last set of location combinations based at least in part on one or more ranking criteria that are not based on distance, and optionally in combination with the associated determined geographical distance for that location combination. In block 550, the routine then selects one or more top-ranked location combinations, and in block 555 determines the multiple geographical regions and one or more POI locations for the received query from the selected top-ranked location combination(s). The routine then continues to block 599 and returns, such as to return to the flow of FIG. 4 at block 435 if invoked from there.

FIG. 6 is a flow diagram of an example embodiment of a client device routine 600. The routine may be provided by, for example, operations of a client computing device 360 of FIGS. 1A-1B and/or a client computing device 360 of FIG. 3 and/or with respect to corresponding functionality discussed with respect to FIGS. 2A-2E and elsewhere herein, such as to interact with users or other entities who submit queries (or other information) to the AMRBID system, to receive responsive answers (or other information) from the AMRBID system, and to optionally use the received information in one or more manners (e.g., to automatically initiate follow-up activities in accordance with a received responsive answer).

The illustrated embodiment of the routine 600 begins at block 603, where information is optionally obtained and stored about the user, such as for later use in personalizing or otherwise customizing further actions to that user. The routine then continues to block 605 to interact with the AMRBID system to initiate an interaction session (e.g., in response to a corresponding instruction from the user), as well as to optionally receive a greeting and/or introductory instructions regarding using a GUI of the AMRBID system. In block 607, the routine then displays a GUI for the interaction session, and optionally displays the received greeting and/or introductory instructions, if any. The routine then continues to perform blocks 610-680 as part of participating in the interaction session.

In particular, the routine continues to block 610 after block 607, where information or a request is received from the user. In block 615, the routine determines if the information or request received in block 610 is a query to submit, such as in a natural language format (e.g., freeform text), and if not continues to block 685. Otherwise, the routine continues to block 620, where it sends the received query to the AMRBID system interface, optionally along with additional information about the user from block 603, to obtain a corresponding responsive answer—in other embodiments, the routine may further modify the received user query to personalize and/or customize the information to be provided to the AMRBID system (e.g., to add information specific to the user, such as location, demographic information, preference information, etc.). In block 630, the routine then receives a responsive answer to the query from the AMRBID system. In block 680, the routine then displays the received query response in the GUI, and optionally initiates further use of the query response in one or more manners (e.g., in a manner that is personalized and/or customized for the user)—in some embodiments, the further initiated activities may include invoking of other functionality of the AMRBID system, such as to initiate an inspection process for a building indicated in building information search results, to initiate a mortgage application process for a building indicated in building information search results, to initiate matching the user with a real estate professional as part of a housing search based on corresponding response information received from the AMRBID system, etc.

In block 685, the routine instead performs one or more indicated operations as appropriate other than receiving and submitting a query, with non-exclusive examples including sending information to the AMRBID system of other types, receiving and storing user data for later use in personalization and/or customization activities, receiving and responding to requests for information about previous user queries and/or corresponding responsive answers for a current user and/or client device, receiving and responding to indications of one or more housekeeping activities to perform, etc. After blocks 680 or 685, the routine continues to block 695 to determine whether to continue, such as until an explicit indication to terminate is received (or alternatively only if an explicit indication to continue is received). If it is determined to continue, the routine returns to block 610, and if not continues to block 699 and ends.

It will be appreciated that in some embodiments the functionality provided by the routines discussed above may be provided in alternative ways, such as being split among more routines or consolidated into fewer routines. Similarly, in some embodiments illustrated routines may provide more or less functionality than is described, such as when other illustrated routines instead lack or include such functionality respectively, or when the amount of functionality that is provided is altered. In addition, while various operations may be illustrated as being performed in a particular manner (e.g., in serial or in parallel, synchronously or asynchronously, etc.) and/or in a particular order, those skilled in the art will appreciate that in other embodiments the operations may be performed in other orders and in other manners. Those skilled in the art will also appreciate that the data structures discussed above may be structured in different manners, such as by having a single data structure split into multiple data structures or by having multiple data structures consolidated into a single data structure. Similarly, in some embodiments illustrated data structures may store more or less information than is described, such as when other illustrated data structures instead lack or include such information respectively, or when the amount or types of information that is stored is altered.

From the foregoing it will be appreciated that, although specific embodiments have been described herein for purposes of illustration, various modifications may be made without deviating from the spirit and scope of the invention. Accordingly, the invention is not limited except as by the claims that are specified and the elements recited therein. In addition, while certain aspects of the invention may be presented at times in certain claim forms, the inventors contemplate the various aspects of the invention in any available claim form. For example, while only some aspects of the invention may be recited at a particular time as being embodied in a computer-readable medium, other aspects may likewise be so embodied.

What is claimed is:

1. A computer-implemented method comprising:

receiving, by one or more computing devices, a user query for information about buildings matching multiple specified search criteria, the multiple specified search criteria represented using a sequence of a plurality of freeform terms submitted using a natural language interface;

segmenting, by the one or more computing devices, the sequence of the plurality of freeform terms into multiple segments each having one or more terms, the multiple segments including a first segment having an incomplete designation of a first geographical region that lacks a unique identification of that first geographical region, and a second segment having an incomplete designation of a second geographical region that lacks a unique identification of that second geographical region, and a third segment having an incomplete designation of a point-of-interest location that lacks a unique identification of that point-of-interest location;

determining, by the one or more computing devices, a first plurality of distinct geographical regions that each has a name matching the incomplete designation of the first geographical region in the first segment, including searching one or more first groups of stored information about geographical region names;

determining, by the one or more computing devices, a second plurality of distinct geographical regions that each has a name matching the incomplete designation of the second geographical region in the second segment, including searching the one or more first groups of stored information about the geographical region names;

determining, by the one or more computing devices, a plurality of point-of-interest locations that each has a name matching the incomplete designation of the point-of-interest location in the third segment, including searching one or more second groups of stored information about point-of-interest location names;

determining, by the one or more computing devices and using the first plurality of distinct geographical regions and the second plurality of distinct geographical regions and the plurality of point-of-interest locations, two or more geographical regions that match the multiple specified search criteria, including:

(a) generating, by the one or more computing devices, a plurality of location combinations for all pairs of the first and second plurality of distinct geographical regions, each location combination including a first geographical location associated with one of the first plurality of distinct geographical regions and a second geographical location associated with one of the second plurality of distinct geographical regions;

(b) determining, by the one or more computing devices and for each of the plurality of location combinations, distances between geographical locations included in that location combination;

(c) determining, by the one or more computing devices, multiple location combination candidates from the plurality of location combinations having determined distances satisfying one or more defined distance criteria;

(d) ranking, by the one or more computing devices, the multiple location combination candidates using one or more defined ranking criteria that are not based on geographical distance;

(e) selecting, by the one or more computing devices, a defined quantity of multiple of the ranked multiple location combination candidates having highest rankings;

(f) generating, by the one or more computing devices, a plurality of new location combinations for all pairs of the plurality of point-of-interest locations and the selected multiple location combinations, each new location combination including the first and second geographical locations for one of the selected multiple location combination candidates and further including a third geographical location that is one of plurality of point-of-interest locations;

(g) performing, by the one or more computing devices, elements (b) and (c) and (d) for the plurality of new location combinations to provide ranked new location combination candidates; and selecting, by the one or more computing devices and based at least in part on a highest ranked one of the ranked new location combination candidates, the determined two or more geographical regions based at least in part on the first and second and third geographical locations for a highest ranked one new location combination candidate;

determining, by the one or more computing devices, one or more buildings located in the determined two or more geographical regions that satisfy the multiple specified search criteria; and presenting, by the one or more computing systems, search results for the user query that include information about the determined one or more buildings.

2. The computer-implemented method of claim 1 wherein geographical locations included in location combinations and associated with geographical regions are each at least one of a location of a center of that associated geographical region or a location on a border of that associated geographical region, wherein the multiple segments further include a fourth segment having an incomplete designation of a third geographical region that lacks a unique identification of that third geographical region, wherein the determining of the two or more geographical regions that match the multiple specified search criteria further includes:

selecting, by the one or more computing devices and after performing element (g), the defined quantity of multiple of the ranked new multiple location combination candidates having highest rankings;

generating, by the one or more computing devices, multiple further new location combinations for all pairs of the selected multiple new location combinations and a third plurality of distinct geographical regions that each has a name matching the incomplete designation of the third geographical region in the fourth segment, each further new location combination including the first and second and third geographical locations for one of the selected multiple new location combination candidates and further including a fourth geographical location associated with one of the third plurality of distinct geographical regions; and performing, by the one or more computing devices, elements (b) and (c) and (d) for the plurality of further new location combinations to provide ranked further new location combination candidates, and wherein the selecting of the determined two or more geographical regions is further based at least in part on the fourth geographical location for a highest ranked one further new location combination candidate.

3. The computer-implemented method of claim 1 wherein geographical locations included in location combinations and associated with geographical regions are each at least one of a location of a center of that associated geographical region or a location on a border of that associated geographical region, wherein the multiple segments further include a fourth segment having an incomplete designation of a second point-of-interest location that lacks a unique identification of that second point-of-interest location, wherein the determining of the two or more geographical regions that match the multiple specified search criteria further includes:

selecting, by the one or more computing devices and after performing element (g), the defined quantity of multiple of the ranked new multiple location combination candidates having highest rankings;

generating, by the one or more computing devices, multiple further new location combinations for all pairs of the selected multiple new location combinations and a second plurality of point-of-interest locations that each has a name matching the incomplete designation of the second point-of-interest location in the fourth segment, each further new location combination including the first and second and third geographical locations for one of the selected multiple new location combination candidates and further including a fourth geographical location that is one of the second plurality of point-of-interest locations; and performing, by the one or more computing devices, elements (b) and (c) and (d) for the plurality of further new location combinations to provide ranked further new location combination candidates, and wherein the selecting of the determined two or more geographical regions is further based at least in part on the fourth geographical location for a highest ranked one further new location combination candidate.

4. A computer-implemented method comprising:

receiving, by one or more computing devices, a user query for information about buildings that satisfy multiple specified search criteria, the multiple specified search criteria including a sequence of freeform terms submitted using a natural language interface;

separating, by the one or more computing devices, the sequence of the freeform terms into multiple segments each having one or more terms, the multiple segments including a first segment having a partial designation of a first geographical region without a unique identification of that first geographical region, and a second segment having a partial designation of a second geographical region without a unique identification of that second geographical region, and a third segment having a partial designation of a point-of-interest location without a unique identification of that point-of-interest location;

determining, by the one or more computing devices, a first plurality of geographical regions that each has a name matching the partial designation of the first geographical region in the first segment, and a second plurality of geographical regions that each has a name matching the partial designation of the second geographical region in the second segment, and a plurality of point-of-interest locations that each has a name matching the partial designation of the point-of-interest location in the third segment;

determining, by the one or more computing devices and using the first plurality of geographical regions and the second plurality of geographical regions and the plurality of point-of-interest locations, two or more geographical regions that match the multiple specified search criteria, including:

generating, by the one or more computing devices, a plurality of location combinations each including at least two of a first geographical location associated with one of the first plurality of geographical regions or a second geographical location associated with one of the second plurality of geographical regions or a third geographical location associated with one of the plurality of point-of-interest locations;

determining, by the one or more computing devices and for each of the plurality of location combinations, distances between geographical locations included in that location combination;

determining, by the one or more computing devices, multiple location combination candidates from the plurality of location combinations that have determined distances satisfying one or more defined distance criteria;

ranking, by the one or more computing devices, the determined multiple location combination candidates using one or more defined ranking criteria that are not based on geographical distance; and selecting, by the one or more computing devices, the determined two or more geographical regions based at least in part on the at least two of the first geographical location or the second geographical location or the third geographical location for a highest ranked one of the ranked multiple location combination candidates;

determining, by the one or more computing devices, one or more buildings located in the determined two or more geographical regions that satisfy the multiple specified search criteria; and providing, by the one or more computing devices, information about the determined one or more buildings as part of response information to the user query.

5. The computer-implemented method of claim 4 wherein the generating of the plurality of location combinations includes generating location combinations for all pairs of the first plurality of geographical regions and the second plurality of geographical regions such that each location combination includes a first geographical location associated with one of the first plurality of geographical regions and a second geographical location associated with one of the second plurality of geographical regions, wherein the determining of the two or more geographical regions further includes:

selecting, by the one or more computing devices and after the ranking of the determined multiple location combination candidates, a defined quantity of highest ranking location combination candidates;

generating, by the one or more computing devices, additional location combinations for all pairs of the selected highest ranking location combination candidates and the plurality of point-of-interest locations, each of the additional location combinations including the first and second geographical locations for one of the selected highest ranking location combination candidates and further including a third geographical location associated with one of the plurality of point-of-interest locations;

determining, by the one or more computing devices and for each of the additional location combinations, distances between geographical locations included in that additional location combination;

determining, by the one or more computing devices, multiple additional location combination candidates from the additional location combinations that have determined distances satisfying the one or more defined distance criteria; and ranking, by the one or more computing devices, the determined multiple additional location combination candidates using the one or more defined ranking criteria that are not based on geographical distance, and wherein the selecting of the determined two or more geographical regions is further based at least in part on the first and second and third geographical locations for a highest ranked one of the ranked multiple additional location combination candidates.

6. The computer-implemented method of claim 4 wherein the generating of the plurality of location combinations includes generating location combinations for all pairs of the first plurality of geographical regions and the plurality of point-of-interest locations such that each location combination includes a first geographical location associated with one of the first plurality of geographical regions and a third geographical location associated with one of the plurality of point-of-interest locations, wherein the determining of the two or more geographical regions further includes:

selecting, by the one or more computing devices and after the ranking of the determined multiple location combination candidates, a defined quantity of highest ranking location combination candidates;

generating, by the one or more computing devices, additional location combinations for all pairs of the selected highest ranking location combination candidates and the second plurality of geographical regions, each of the additional location combinations including the first and third geographical locations for one of the selected highest ranking location combination candidates and further including a second geographical location associated with one of the second plurality of geographical regions;

determining, by the one or more computing devices and for each of the additional location combinations, distances between geographical locations included in that additional location combination;

determining, by the one or more computing devices, multiple additional location combination candidates from the additional location combinations that have determined distances satisfying the one or more defined distance criteria; and ranking, by the one or more computing devices, the determined multiple additional location combination candidates using the one or more defined ranking criteria that are not based on geographical distance, and wherein the selecting of the determined two or more geographical regions is further based at least in part on the first and second and third geographical locations for a highest ranked one of the ranked multiple additional location combination candidates.

7. The computer-implemented method of claim 4 wherein the highest ranked one location combination candidate includes a third geographical location associated with one of the plurality of point-of-interest locations, and wherein the determining of the one or more buildings located in the determined two or more geographical regions further includes selecting the one or more buildings based at least in part on proximity of the one or more buildings to the third geographical location for the highest ranked one location combination candidate.

8. The computer-implemented method of claim 4 wherein each of the location combinations includes two geographical locations, and wherein the determining of the distances between the two geographical locations included in each of the location combinations includes at least one of determining a straight-line distance between the two geographical locations, or determining a driving distance between the two geographical locations, or determining a walking distance between the two geographical locations.

9. The computer-implemented method of claim 4 wherein each of the location combinations includes at least three geographical locations, and wherein the determining of the distances between the at least three geographical locations included in each of the location combinations includes at least one of, for each pair of the at least three geographical locations, determining a straight-line distance between the geographical locations of that pair, or determining a driving distance between the geographical locations of that pair, or determining a walking distance between the geographical locations of that pair, and further includes aggregating determined distances for each of the pairs.

10. The computer-implemented method of claim 4 wherein each of the geographical locations included in a location combination and associated with a geographical region is at least one of geographical location at a center of that geographical region or a geographical location on a border of that geographical region.

11. The computer-implemented method of claim 4 wherein the ranking of the determined multiple location combination candidates using the one or more defined ranking criteria includes using at least one of a population of each geographical region associated with a geographical location in that location combination candidate, or a popularity of each geographical region associated with a geographical location in that location combination candidate, or a proximity of each geographical region associated with a geographical location in that location combination candidate to a geographical location associated with a user who supplies the user query.

12. The computer-implemented method of claim 4 wherein the partial designation of the point-of-interest location in the third segment includes an indication of a category of point-of-interests, and wherein the plurality of point-of-interest locations include locations of multiple points of interest of the category.

13. The computer-implemented method of claim 4 wherein the user query is received from a client device, and wherein the providing of the information about the determined one or more buildings includes transmitting, by the one or more computing devices, search results that include the information about the determined one or more buildings over one or more computer networks to the client device for display on the client device.

14. A non-transitory computer-readable medium having stored contents that cause one or more computing devices to perform automated operations, the automated operations including at least:

receiving, by the one or more computing devices, a user query for information about buildings that satisfy multiple specified search criteria, the multiple specified search criteria including a sequence of freeform terms;

separating, by the one or more computing devices, the sequence of the freeform terms into multiple segments each having one or more terms, the multiple segments including a first segment having a partial designation of a first geographical region without a unique identification of that first geographical region, and a second segment having a partial designation of a second geographical region without a unique identification of that second geographical region;

determining, by the one or more computing devices, a first plurality of geographical regions that each matches the partial designation of the first geographical region in the first segment, and a second plurality of geographical regions that each matches the partial designation of the second geographical region in the second segment;

determining, by the one or more computing devices, two or more geographical regions that match the multiple specified search criteria, including:

generating, by the one or more computing devices, a plurality of location combinations each including one or more first geographical locations associated with one of the first plurality of geographical regions and one or more second geographical locations associated with one of the second plurality of geographical regions; and selecting one of the plurality of location combinations based at least in part on a distance between the first and second geographical locations included in that location combination and on one or more additional criteria that are not based on distance, and determining the two or more geographical regions based on the first and second geographical locations included in the selected one location combination;

determining, by the one or more computing devices, one or more buildings located in the determined two or more geographical regions that satisfy the multiple specified search criteria; and providing, by the one or more computing devices, information about the determined one or more buildings as part of response information to the user query.

15. The non-transitory computer-readable medium of claim 14 wherein the multiple segments further include a third segment having a partial designation of a point-of-interest location without a unique identification of that point-of-interest location, wherein the stored contents include software instructions that, when executed, cause the one or more computing devices to perform further automated operations including determining, by the one or more computing devices, a plurality of point-of-interest locations that each has a name matching the partial designation of the point-of-interest location in the third segment, wherein at least some of the location combinations each further includes one or more third geographical locations associated with one of the plurality of geographical regions, wherein the one location combination is one of the at least location combinations and is further selected based in part on one or more additional distances between at least one of the one or more third geographical locations included in the selected one location combination and at least one of the first and second geographical locations included in the selected one location combination, and wherein the determining of the two or more geographical regions is further based in part on the third geographical locations included in the selected one location combination.

16. The non-transitory computer-readable medium of claim 14 wherein the multiple segments further include a third segment having at least a partial designation of a point-of-interest location, and wherein the determining of the one or more buildings located in the determined two or more geographical regions further includes selecting the one or more buildings based at least in part on proximity of the one or more buildings to the point-of-interest location.

17. The non-transitory computer-readable medium of claim 14 wherein the automated operations further include determining the distance between the first and second geographical locations included in the selected one location combination using at least one of a straight-line distance between the first and second geographical locations, or a driving distance between the first and second geographical locations, or a walking distance between the first and second geographical locations.

18. The non-transitory computer-readable medium of claim 14 wherein the automated operations further include ranking the plurality of location combinations using the one or more additional criteria, the one or more additional criteria including at least one of a population of each geographical region associated with a geographical location in that location combination, or a popularity of each geographical region associated with a geographical location in that location combination, or a proximity of each geographical region associated with a geographical location in that location combination to a geographical location associated with a user who supplies the user query, and wherein the selecting of the one location combination is based at least in part on the ranking.

19. A system comprising:
one or more hardware processors of one or more computing devices; and
one or more memories with stored instructions that, when executed by at least one of the one or more hardware processors, cause at least one computing device of the one or more computing devices to perform automated operations including at least:
receiving a user query for information about buildings that satisfy multiple specified search criteria, the multiple specified search criteria including a sequence of freeform terms;
separating the sequence of the freeform terms into multiple segments that have multiple partial designations of multiple geographical locations without unique identifications of the multiple geographical locations and that each has one or more terms, the multiple segments each having a respective one of the multiple partial designations that is associated with one or more respective geographical locations of the multiple geographical locations without a unique identification of those one or more respective geographical locations;
determining, for each of the multiple segments, a respective plurality of candidate geographical locations matching the respective one partial designation associated with the one or more respective geographical locations for that segment;
determining two or more geographical regions that match the multiple specified search criteria, including:
generating a plurality of location combinations each including one or more first geographical locations from the respective plurality of candidate geographical locations for one of the multiple segments and one or more second geographical locations from the respective plurality of candidate geographical locations for another of the multiple segments separate from the one segment; and
ranking the plurality of location combinations based at least in part on a distance between the first and second geographical locations included in the location combinations and on one or more additional criteria that are not based on distance, selecting one location combination of the plurality based at least in part on the ranking, and determining the two or more geographical regions based on the first and second geographical locations included in the selected one location combination;
determining one or more buildings located in the determined two or more geographical regions that satisfy the multiple specified search criteria; and
providing information about the determined one or more buildings as part of response information to the user query.

20. The system of claim 19 wherein the multiple segments include a first segment having a partial designation of a first geographical region without a unique identification of that first geographical region, and a second segment having a partial designation of a second geographical region without a unique identification of that second geographical region, and a third segment having a partial designation of a point-of-interest location without a unique identification of that point-of-interest location, wherein the determining of the respective plurality of candidate geographical locations for the first segment includes determining a first plurality of geographical regions that each matches the partial designation of the first geographical region and is each associated with at least one of the one or more geographical locations for the first segment, wherein the determining of the respective plurality of candidate geographical locations for the second segment includes determining a second plurality of geographical regions that each matches the partial designation of the second geographical region and is each associated with at least one of the one or more geographical locations for the second segment, and wherein each of the location combinations includes at least a first geographical location associated with one of the first plurality of geographical regions and a second geographical location associated with one of the second plurality of geographical regions.

21. The system of claim 20 wherein the determining of the one or more buildings located in the determined two or more geographical regions further includes selecting the one or more buildings based at least in part on proximity of the one or more buildings to the point-of-interest location.

22. The system of claim 19 wherein the automated operations further include determining the distance between the first and second geographical locations included in the selected one location combination using at least one of a straight-line distance between the first and second geographical locations, or a driving distance between the first and second geographical locations, or a walking distance between the first and second geographical locations.

23. The system of claim 19 wherein the one or more additional criteria include at least one of a population of each geographical region associated with a geographical location in that location combination, or a popularity of each geographical region associated with a geographical location in that location combination, or a proximity of each geographical region associated with a geographical location in that location combination to a geographical location associated with a user who supplies the user query.

* * * * *